United States Patent
Stenning et al.

(10) Patent No.: US 11,721,195 B2
(45) Date of Patent: Aug. 8, 2023

(54) AUGMENTED INDUSTRIAL MANAGEMENT

(71) Applicant: Raven Telemetry Inc., Ottawa (CA)

(72) Inventors: Braden Stenning, Ottawa (CA); Martin Cloake, Ottawa (CA); James Robinson, Ottawa (CA)

(73) Assignee: RAVEN TELEMETRY INC., Ottawa (CA)

( * ) Notice: Subject to any disclaimer, the term of this patent is extended or adjusted under 35 U.S.C. 154(b) by 965 days.

(21) Appl. No.: 16/152,441

(22) Filed: Oct. 5, 2018

(65) Prior Publication Data

US 2019/0108747 A1   Apr. 11, 2019

Related U.S. Application Data

(60) Provisional application No. 62/569,338, filed on Oct. 6, 2017.

(51) Int. Cl.
| | |
|---|---|
| *G08B 21/18* | (2006.01) |
| *F16P 3/00* | (2006.01) |
| *G05B 23/02* | (2006.01) |
| *G05B 19/05* | (2006.01) |

(52) U.S. Cl.
CPC .............. *G08B 21/187* (2013.01); *F16P 3/00* (2013.01); *G05B 19/05* (2013.01); *G05B 23/0235* (2013.01); *G05B 2219/15117* (2013.01)

(58) Field of Classification Search
USPC ........................................................ 340/679
See application file for complete search history.

(56) References Cited

U.S. PATENT DOCUMENTS

| | | | |
|---|---|---|---|
| 7,295,950 B2 | 11/2007 | Iyengar | |
| 7,676,294 B2 | 3/2010 | Baier et al. | |
| 8,626,385 B2 | 1/2014 | Humphrey | |
| 9,438,648 B2 | 9/2016 | Asenjo | |
| 9,471,452 B2 | 10/2016 | McElhinney | |
| 9,535,808 B2 | 1/2017 | Bates | |
| 9,665,843 B2 | 5/2017 | Smiley | |
| 2007/0252675 A1* | 11/2007 | Lamar ................ | G07C 9/00309 340/5.64 |
| 2010/0249968 A1* | 9/2010 | Neuber ................ | G06Q 50/04 700/99 |
| 2011/0258568 A1* | 10/2011 | Pandurangan ....... | G05B 19/409 715/810 |
| 2012/0016607 A1* | 1/2012 | Cottrell ............. | G05B 23/0229 702/62 |
| 2014/0222521 A1* | 8/2014 | Chait ................ | G06Q 10/0637 705/7.36 |
| 2016/0217406 A1 | 7/2016 | Najmi | |
| 2017/0337287 A1* | 11/2017 | Gill ...................... | G06F 16/9537 |
| 2018/0181270 A1* | 6/2018 | Muramoto ............ | G06F 8/20 |

(Continued)

*Primary Examiner* — Jack K Wang

(57) ABSTRACT

A system and method for providing prescriptive analytics in an industrial process wherein a machine tap collects raw performance data from a machine, a machine user interface collects context data on operation of the machine, a server aggregates the performance data and context data, and an analytics engine analyzes the performance data and context data and generates analytics data. An alert engine compares the performance data, context data, and analytics data against a trigger definition, creates an alert if the trigger definition is satisfied, and sends the alert to a remote device to provide prescriptive guidance for improving process performance.

19 Claims, 24 Drawing Sheets

(56) References Cited

U.S. PATENT DOCUMENTS

2019/0072943 A1* 3/2019 Przybylski ............. G06Q 50/06
2019/0186928 A1* 6/2019 Blandin ............. G01C 21/3415
2019/0378074 A1* 12/2019 McPhatter ........... G06Q 10/067

* cited by examiner

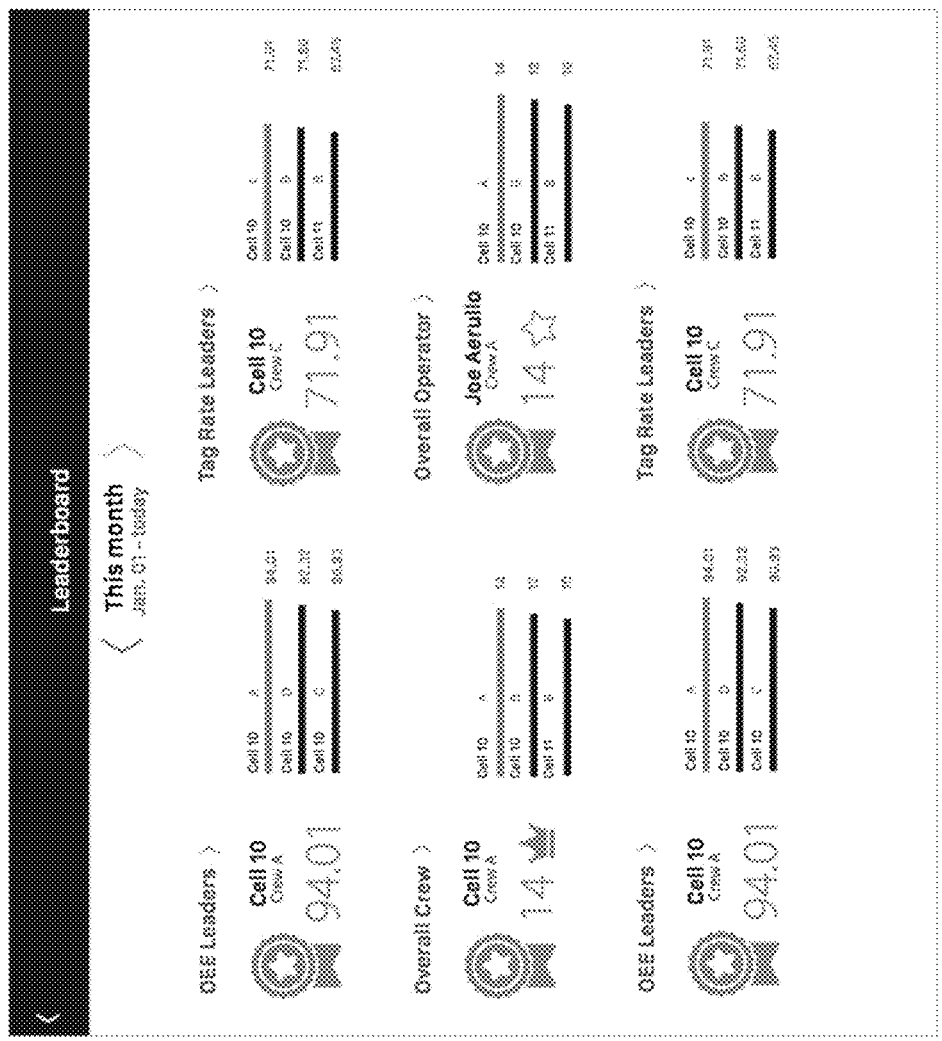
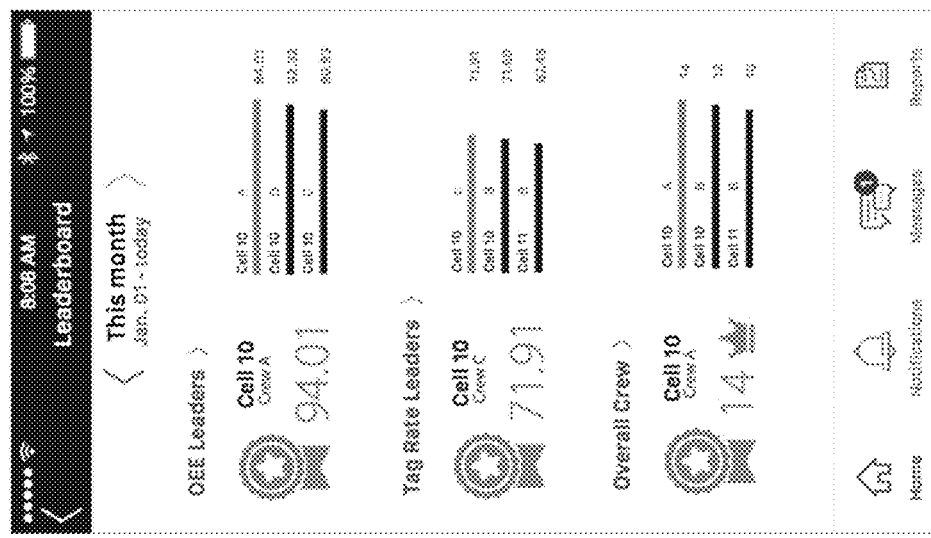
Figure 9B
Figure 9A

| | Shift A | Shift B | Shift C |
|---|---|---|---|
| OEE | 94 | 74% | 74% |
| Tagging | 99 | 93% | 93% |
| Filling | -2.5% | -3.5% | -3.5% |
| Wheel Dressing | -1.4% | -2.7% | -2.7% |
| Labour Shortage | -1.0% | -15% | -15% |
| Sets >90% | 12/15 | 6/16 | 6/16 |
| Crowns | 3 | 1 | 1 |
| Sets < 80% | 0 | 7 | 7 |
| Supervisor OEE saved | 1.1% | 2.4% | 2.4% |
| Maintenance OEE saved | 0.8% | 5.5% | 5.5% |

Shift A (Night)

| set | OEE (%) | Filling (%) | Labor shortage (%) | Tagging (%) |
|---|---|---|---|---|
| 10 | 92 | -2.2 | - | 99 |
| 8 | 91 | -2.7 | - | 98 |
| 2 | 91 | -3.1 | - | 98 |
| 12 | 89 | -2.8 | - | 98 |
| 6 | 86 | -3.2 | - | 98 |
| 9 | 86 | 7 | -0.5 | 91 |
| 1 | 85 | -2.2 | -2.2 | 98 |
| 11 | 81 | -5.3 | - | 99 |
| 3 | 80 | -4.1 | -2.2 | 60 |
| 7 | 77 | -9.1 | - | 98 |
| 4 | 71 | -2.2 | -23.2 | 97 |
| 5 | 55 | 7 | -24.1 | 100 |

Figure 19B

AUGMENTED INDUSTRIAL MANAGEMENT

CROSS-REFERENCE TO RELATED APPLICATIONS

This application claims priority to U.S. provisional patent application Ser. No. 62/569,338 filed Oct. 6, 2018, incorporated by reference herein in its entirety.

FIELD OF THE INVENTION

The present invention pertains to a system and method for augmented industrial management using prescriptive analytics to improve industrial process performance.

BACKGROUND

In manufacturing facilities, the effective use of equipment and operator skill and time are important factors in determining operational performance and production line efficiency. With increased global competition, maximizing the efficiency of all assets and operators within a manufacturing plant is key to economic viability and productivity.

One commonly used measure to track equipment utilization is Overall Equipment Effectiveness (OEE), which is a measure of the time equipment is used compared to the time the equipment is available, multiplied by the quality of product produced. OEE focuses on where productive time is lost in a manufacturing process so that lost time can be addressed and the process made more efficient. In an OEE analysis, loss can occur as unplanned stops such as machine failure, material shortage, machine setup and machine adjustment time, or planned stops such as machine changeover time or scheduled maintenance. Whether planned or unplanned, any event that stops production for an appreciable length of time creates loss since it is time that could otherwise be used for manufacturing.

There are many ways to measure production line efficiency. U.S. Pat. No. 9,471,452 to McElhinney et al. describes defining and executing predictive models for outputting health metrics that estimate the operating health of an asset or a part thereof, analyzing health metrics to determine variables that are associated with high health metrics, and modifying the handling of abnormal-condition indicators in accordance with a prediction of a likely response to such abnormal-condition indicators.

U.S. Pat. No. 9,535,808 to Bates et al. describes a system for performing failure signature recognition training for a unit of equipment by receiving sensor data and failure information relating to equipment failures and analyzing the sensor data in view of the failure to develop a failure signature recognition with respect to the unit of equipment.

There remains a need for understanding process performance as a combination of machine and operator productivity and providing actionable data to affect overall process performance and provide augmented industrial management.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an augmented industrial management system and method.

In an aspect there is provided a system for augmented industrial management comprising: a machine tap for collecting raw performance data from a machine; a machine user interface for collecting context data on operation of the machine; a server for aggregating the performance data and context data; an analytics engine for analyzing the performance data and context data and generating analytics data; an alert engine for translating the performance data, the context data, and the analytics data, and comparing against a trigger definition, the alert engine creating an alert if the trigger definition is satisfied; and a remote device for receiving the alert created by the alert engine.

In an embodiment, the system further comprises a context tap for collecting the context data. In another embodiment, the context data comprises one or more of identification of the part being manufactured, step of manufacturing, identification of the operator at the machine, batch information, information on the primary materials being processed by the machine, work order identification, machine task in progress, and tag describing the machine state at a particular time.

In another embodiment, the raw performance data comprises one or more of machine state, machine count, machine running speed, and sensor data.

In another embodiment, the alert engine comprises one or more of a plurality of trigger definitions. In another embodiment, the trigger definition comprises up-time, down time, counts, rates, error codes, timestamping, and context tags.

In another embodiment, the raw performance data comprises one or more of machine state, machine count, machine running speed, and sensor data.

In another embodiment, the machine tap comprises one or more of a sensor for detecting sound frequency, sound pressure, sound pressure level, sound intensity, sound power, equipment electrical energy consumption, change in electrical current consumption, voltage, change in voltage, temperature, thermal imaging, motion, emitted light or light intensity, imagery, depth image, point cloud, air flow, vibration, acceleration, mechanical forces, and electro-magnetic radiation.

In another embodiment, the trigger definition comprises analytics data.

In another embodiment, the analytics engine tracks a response time between the alert received at the remote device and a time the alert is addressed.

In another embodiment, the response time is gamified to incentivize shorter response times.

In another aspect there is provided a method of augmented industrial management comprising: collecting raw performance data from a machine; collecting context data on operation of the machine; aggregating the performance data and context data; analyzing the performance data and context data to generate analytics data; comparing the performance data, the context data, and the analytics data against a trigger definition; and, if the trigger definition is satisfied: generating an alert; and sending the alert to a remote device.

In an embodiment, the context data is collected at one or more of a machine user interface, enterprise resource system, server, database, or a combination thereof. In another embodiment, the raw performance data comprises machine up-time, machine down time, changeover time, filling frequency, machine count, machine time running slow, and sensor data.

In another embodiment, the context data comprises identification of one or more of the part being manufactured, step of manufacturing, identification of the operator at the machine, batch information, information on the primary materials being processed by the machine, work order identification, machine task in progress, and tag describing the machine state at a particular time.

In another embodiment, the alert is sent in real-time.

In another embodiment, the alert reports at least one machine performance metric to the remote device, machine user interface, or both.

In another embodiment, the method further comprises: identifying a prescriptive action for improvement of industrial process performance; and sending the prescriptive action to the remote device.

In another embodiment, the raw performance data comprises one or more of machine state, machine count, machine running speed, and sensor data.

In another aspect there is provided a system for performing prescriptive analytics of an industrial machine, the system comprising: a memory that stores executable components; a processor, operatively coupled to the memory, that executes the executable components, the executable components comprising: a machine tap configured to receive machine data from a machine and store the data on a storage device, wherein the machine data comprises process data relating to an industrial process; a context tap configured to collect machine context data; an analytics engine configured to analyze the machine data and the context data and generate analytics data; an alert engine configured to test a set of trigger conditions against the machine data, context data, analytics data, or a combination thereof, and if a trigger condition is met, generate an alert; and a communication component configured to send the alert to a remote device prescribing a modification to improve process performance.

In an embodiment, the alert is communicated in real-time.

In another aspect there is provided a method of providing an alert in a process environment, the method comprising: receiving a data stream at an alert engine, the data stream comprising: raw performance data from a machine tap; context data for the machine from a context tap; and analytics data from an analytics engine; testing a trigger condition again the data stream; generating an alert if a trigger condition is met; and sending the alert to a remote device.

In an embodiment, the method further comprises: identifying a prescriptive action for improvement of industrial process performance; and sending the prescriptive action to the remote device.

BRIEF DESCRIPTION OF THE FIGURES

For a better understanding of the present invention, as well as other aspects and further features thereof, reference is made to the following description which is to be used in conjunction with the accompanying drawings, where:

FIG. 9A is a display of performance analysis with gamification for an individual operator on a mobile device;

FIG. 9B is a display of performance analysis with gamification for an individual operator on a display screen;

FIG. 19B is a detailed view of data provided in an example daily insight report.

DETAILED DESCRIPTION

Figure 1A:
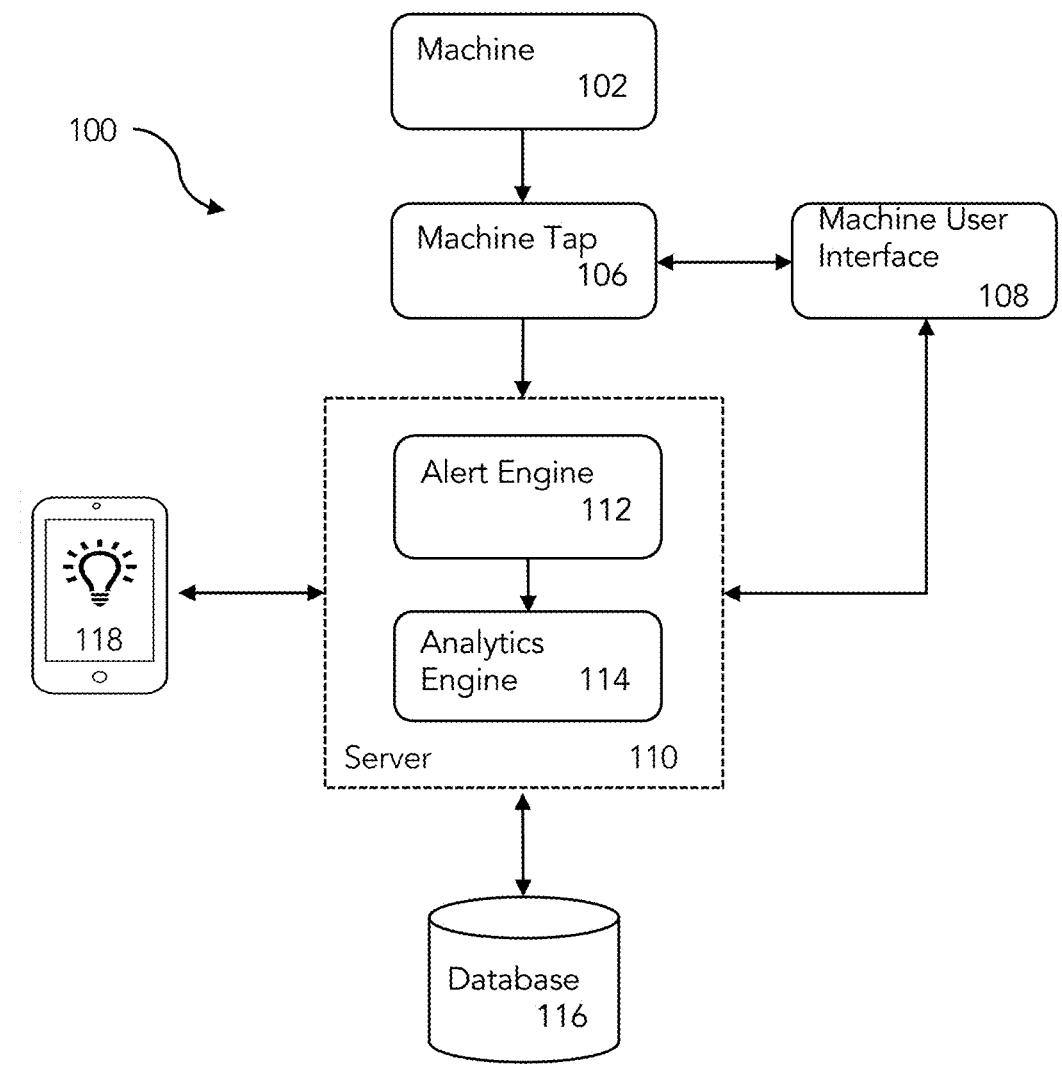
FIG. 1A is a block diagram of an embodiment of a system configured to provide augmented industrial management.

The following describes various features and functions of the disclosed system and method with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein. Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "SKU" as used herein refers to a stock keeping unit (SKU), or product identification code that identifies a product on a manufacturing line, or a step in a manufacturing task that requires multiple manufacturing steps.

As used herein, the term "raw performance data" refers to data pertaining to the working state of a machine. One simple set of raw performance data can include whether a machine is on or off, including the timestamp and duration at each data point. Other sets of raw performance data can include, for example, machine count, machine running speed, sensor data, or a combination thereof.

As used herein, the term "context data" refers to data collected through a machine user interface from a machine operator on a machine state or status. Context data can include, for example, identification of a part being manufactured, step of manufacturing, identification of the operator at the machine, batch information, information about the task or operation being done by the machine (SKU task), information on the primary materials being processed by the machine, work order identification, or machine task in progress, raw performance data, or tags which describe the machine state at a particular time.

As used herein, the term "analytics data" refers to data generated by the analytics engine based on the performance data and the context data. Analytics data is generated based on pattern recognition and/or machine learning by aggregating performance data, context data, and optionally also alert data. The analytics data can indicate trends on machine and/or operator performance over a longer period of time or comparisons between operators and/or machine performance and/or SKUed manufacturing process. Analytics data can be generated by machine learning pattern matching, interpolation, imputation, extrapolation, or generalization (predicting the likelihood of a pattern that has not been observed before but is drawn on previously observed patterns) based on historical performance and can predict future performance of a machine and/or operator.

Herein is provided an augmented industrial management system and method using prescriptive analytics. The present system and method can lead to improved process performance, in particular in manufacturing and industrial environments. Improvements in manufacturing process performance can result in, for example, decrease in downtime, greater worker productivity, improved machine productivity, increased profitability, or a combination thereof. The realtime prescriptive analytics platform described herein interprets shop floor data and provides intelligent, actionable information in real time. Factory floor and manufacturing supervisors and operators can take advantage of augmented industrial management through real-time analytics to increase profitability and productivity for immediate and continuous results by being aware not only of real-time alerts, but also of trends in machine and worker or operator performance. Prescriptive analytics in manufacturing can further lead to, for example, better decision making and problem solving, increased leadership involvement, targeted and appropriate training for operators, improved productivity for operators and managers, and improved overall productivity.

The present system and method of augmented industrial management provides real-time prescriptive analytics to interpret shop floor and operator data and provides intelligent actions to operators, supervisors, and managers for immediate action and impact. By collecting real-time data about machine and operator function and productivity, the present system and method provides actionable guidance based on data analytics to improve overall manufacturing performance with the same people and machines without technical machine upgrade. As the analytics learning engine uncovers insights about each machine and/or operator in a manufacturing facility, manufacturers can obtain granular data on machine and operator productivity and leverage data in real time. By preventing losses, maintaining gains, and suggesting improvements, manufacturers can better understand and improve process performance through augmented industrial management.

Machine predictive maintenance is a process which combines diagnostic and performance data, operator intuition, maintenance histories, operator logs and design data to schedule maintenance of equipment. Measured physical parameters can be compared against known engineering limits for the purpose of detecting, analyzing and correcting a problem before a slowdown or failure occurs. Sufficient advanced information including early detection of suboptimal machine performance can assist in scheduling routine maintenance and reduce unexpected downtime and operating costs. Operator behavior while on shift can also have an effect on productivity, which can be detected using the present system and method. Some operator behaviors detrimental to productivity include slowing down a machine at the end of an operator's shift so as not to have to refill their machine before the end of their shift and pass on a refilling task to the next shift operator, slowing a machine down due to lack of technical skill, longer machine downtime due to delayed refilling, and unnoticed maintenance requirements. In addition, some operators may be more skilled at operating particular machines, and some operators may have developed techniques for avoiding downtime, noticing maintenance opportunities, and balancing workload which result in greater productivity.

The present augmented industrial management platform works with existing machine technology to synthesize insightful information from operating data. Plant operators and supervisors are given prescriptive actionable data, which is available in real-time, to prevent losses, maintain gains, and identify potential for reduction of losses. Data sent to the analytics learning engine uncovers insights about the plant, which can enable manufacturers to continuously and consistently improve productivity and therefore profitability. The present augmented industrial management system and method can also be used to, for example, uncover industrial productivity insights and patterns, find patterns that predict future performance, detect variability in machine and/or operator performance, and detect unhealthiness in the machine and/or operator behaviour. By displaying actionable information to the right people at the right time, machine operators can be empowered to appropriately escalate issues, alert and notify appropriate individuals within an organization, and be presented transparent, accessible, and actionable data. Human-machine interface best practices can be combined with lean manufacturing techniques to provide accessible and interactive machine user interfaces which convey process variances and machine anomalies, and deliver actionable information to any capable smart device or hardware for organization-wide consumption and adoption. While it may not be possible to completely eliminate changeover time, in most cases opportunities for recovering lost time can be identified using pattern recognition, machine learning, and/or analytics.

FIG. 1A is a block diagram of a system 100 configured to collect machine data and provide an alert and prescriptive analytics for augmented industrial management. The system 100 collects, processes, and disseminates industrial data pertaining to the functioning of a machine and relays it to an operator and/or manager by way of an output device to provide prescriptive analytics for process performance and augmented industrial management. The industrial machine 102 is monitored by a machine tap 106 which is configured to collect and aggregate industrial data describing the status of the industrial machine 102. The machine tap 106 comprises an input device that collects machine data by connecting to the industrial machine 102 and/or its controllers and a means for communicating the machine data to a server for processing and/or storage of the data, optionally over a network. The machine tap can optionally have one or more sensors configured to obtain data relating to the functioning of the industrial machine 102. The one or more sensors can obtain measurements and sensor readings that are associated with or can be correlated to equipment functionality, including but not limited to sound frequency, sound pressure, sound pressure level, sound intensity, sound power, equipment electrical energy consumption, change in electrical current consumption, voltage, change in voltage, temperature, thermal imaging, motion, emitted light or light intensity, imagery, depth image, point cloud, air flow, vibration, acceleration, mechanical forces, and electro-magnetic radiation. Machine vision sensors including laser scanning such as LIDAR (light detection and ranging), still and video imagery, structured light sensors, can also be used to collect visual and/or spatial information for processing. Other sensing systems such as ultrasonic rangers, ultrasound imaging, geiger counter and other sensors for non-destructive testing can also be used. Voltage and changes in voltage over time at the machine can also be detected to determine machine state at an instant or over a period of time.

The machine tap 106 can also comprise an output component to send signals back to the machine 102 or to other devices, such as a remote device 118 which can include an alert light. The machine tap 106 may also be a server or connected to a server for communicating to one or more controller or computer, such as for example a programmable logic controller (PLC), of a machine over a network. In one optional embodiment, the remote device 118 receives performance information directly from the machine tap 106 by the machine tap 106 pushing information to the remote device 118 or the remote device 118 directly accessing information on the machine tap 106. Optionally, the remote device 118 can be an alert device such as a light, either wired or Wi-Fi activated, in communication with the data tap such that the alert is triggered when attention is required or when prescribed by the system.

Figure 1B:
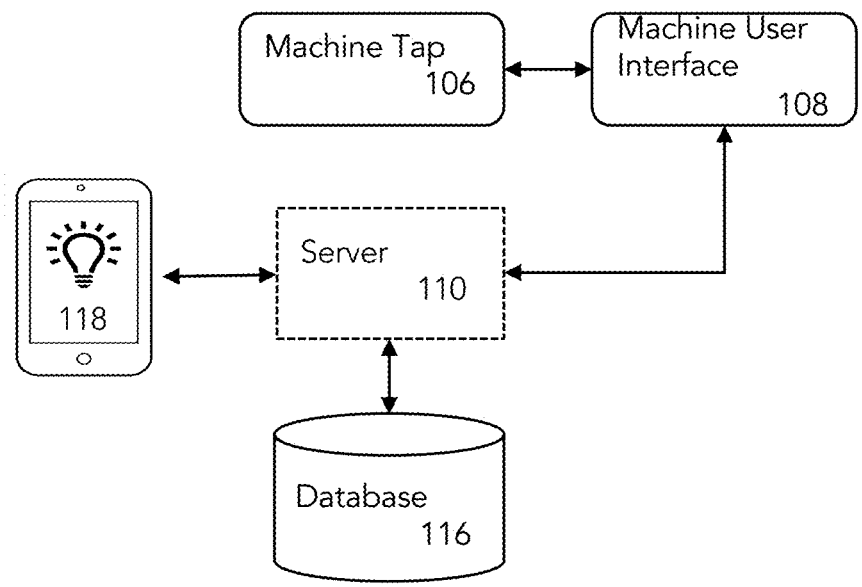
FIG. 1B a block diagram of another embodiment of a system configured to provide augmented industrial management.
Figure 1C:
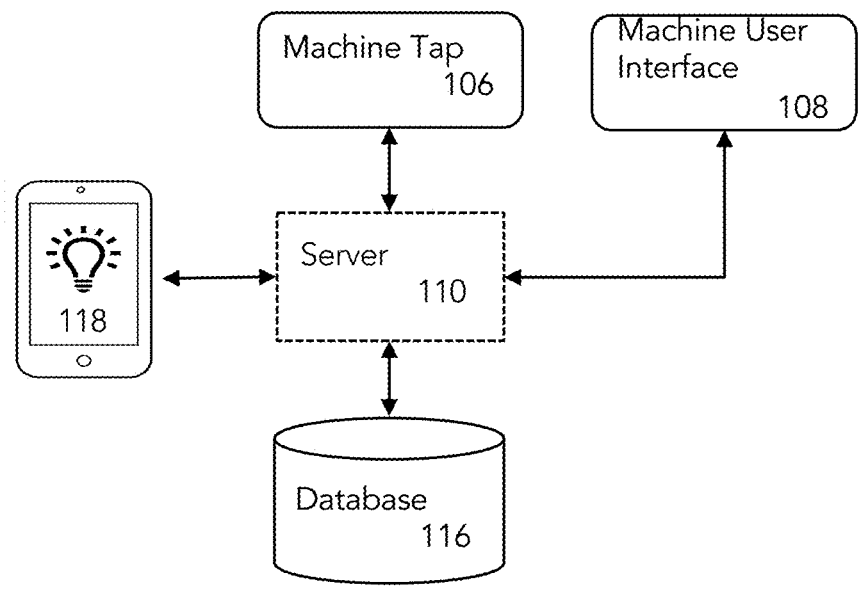
FIG. 1C a block diagram of another embodiment of a system configured to provide augmented industrial management.

The machine tap 106 is also connected directly or indirectly, optionally through a network, to a machine user interface 108 that provides information to the machine operator and obtains context data from the machine operator on the machine state or status. The machine user interface is any device that is capable of communicating machine data to a machine operator. Example of machine user interfaces include but are not limited to one or more tablets, screens, digital displays, light displays, conversational interface, voice or gesture interface, augmented reality, or any system capable of communicating to and receiving input from a user. The system can have one or more machine tap 106 from one or more machines or stations on a manufacturing floor or in an organization. As shown in FIG. 1A, the machine user interface 108 is connected to both the machine tap 106 and the server 110. In another configuration shown in FIG. 1B, the machine user interface 108 is connected to the machine tap 106, and the server 110 is connected to the machine tap 106 to receive raw performance data from the machine 102. In another configuration shown in FIG. 1C, the machine user interface 108 is connected the server 110, which is connected to the machine tap. Performance data can be collected by the machine tap 106 and sent to the server 110 periodically, in batches, or any time the values of the raw performance data change. The server 110 aggregates the raw performance data from the machine tap and the context data. The server may also transform the input data into new data streams, store the input data for later retrieval, or push updates to devices that subscribe to the data streams.

The raw performance data can comprise machine state, which is the status of a machine at a moment in time, and can contribute to a pattern of use over time. Machine state can be on, off, error, full stop, and the machine state can be obtained from one or more sensors taking one or more sensor readings over time. Machine count (number of units or quantity of production over time), machine running speed, and sensor data can also be collected as raw performance data by the machine tap. For example, a change in machine state can trigger a performance data update to be sent to the server 110. The machine tap 106 may also be configured to do edge processing such that analysis can be done close to the point of data collection or display to reduce bandwidth, data storage requirements, or computational load on the server. The machine user interface 108 can also collect data and performance analysis on the data stream and perform simple data processing or transformation such as translating an incoming data stream into a compressed data representation of the performance data. The machine user interface 108 can have at least one machine display to display, for example, information about the system or machine state.

Performance data collected by the machine tap 106 and context data collected through the machine user interface 108 is transmitted to the server 110, which can be one or more servers. The server 110 collects and aggregates data from the machine tap 106, machine user interface 108 and optionally a context tap, and sends the data to be stored in a database 116. Although FIG. 1A is shown with a single machine tap 106, it is understood that an industrial environment may have multiple industrial machines each with its own data tap connected to the server 110. The server 110 processes the data and can send a real-time alert from alert engine 112 to a machine operator, supervisor, and/or management by remote device 118, or back to the machine user interface 108 for view by the machine operator. Reactive alerts or real-time alerts can be provided to operators by the alert engine 112 advising on the operating performance of the machine. For example, if the machine tap 106 recognizes a machine state of 'idle' and the machine user interface 108 provides associated context data that a filling is occurring, the alert trigger may be time sensitive so allow a certain window for filling prior to being triggered. If the machine tap 106 recognizes a machine state of 'idle' for a prolonged period of time, an alert may be sent regardless of tagging. In another case, if a tag is received at the machine user interface indicating a breakdown, an alert will be triggered regardless of the machine state recognized by the machine tap 106.

Analytics engine 114 provides prescriptive alerts generated based on pattern recognition and/or machine learning by aggregating performance data, context data and alert data. The remote device 118 and/or machine user interface 108 can be configured to produce an alert such as, for example, a light, vibration, change of colour, or sound, to alert the machine operator and/or supervisor that their attention is required. The remote device 118 can also be a mobile device such as a smartphone or tablet with a mobile app for interfacing with the server, optionally with capability to provide notifications as an alert to the user such as, for example, by email, popup notification, SMS or webportal. Other examples of remote devices that can be used are: virtual reality devices such as headsets, headphones, and glasses; wearable devices; smart clothing; smart watches; and implants. Alerts can also be projected visually or sonically from a receiving device onto a surface visible to the intended recipient of the alert. The remote device may also generate a simple notification such as a light, vibration, sound, or other alert mechanism.

Figure 2A:
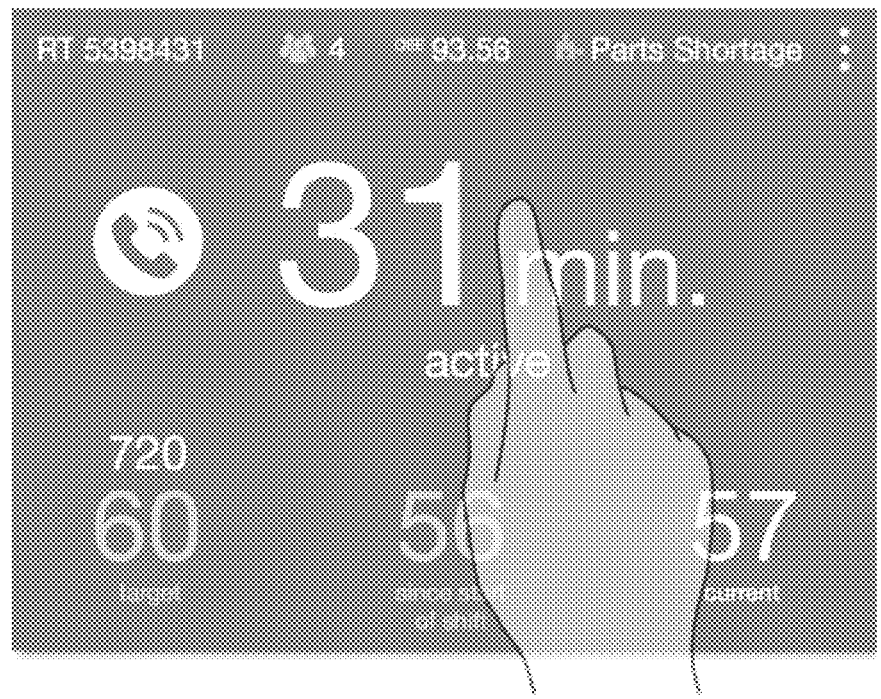
FIG. 2A is an example machine state display on the machine user interface.

An example of a machine state display on the machine user interface 108 is shown in FIG. 2A. The machine user interface can query the operator with one or more tags pertaining to the state or operation of the machine. The machine state display can have, for example, one or more of the SKU numbers of the part being machined, operator count, an OEE indicator, a current or recent tag, a menu access button, clock, indicator count, performance data, productivity data, batch and/or production count, and a call button. The operator can be queued to change the SKU number to indicate a change in manufacturing product. Data entry by the operator can be done by keyboard, virtual keyboard, one or more buttons, or any other data entry means. Operators can access the machine user interface using a login display, which is optionally password protected to control access and verify the operator identity. Access to the machine user interface can also be provided by biometric scan such as fingerprint, retina or other biometric, token identification, technology proximity detector, RFID tag, or other identification device.

The machine state display is preferably colour-coded such that the operator can rapidly discern the machine state by a quick glance at the machine user interface. In an example, the machine state display can be green if the machine is running well, yellow if there is a sub-optimal condition, such as pertaining to the rate or machine state, which may require operator intervention, or red if there is a sub-optimal condition which requires operator tagging or immediate action. If the machine state that invoked the tag is resolved, the operator can remove or clear the tag. Should the operator require assistance, a call button can be used to notify a lead hand, maintenance personnel, or supervisor. Based on the information received by tagging at the machine user interface and the performance data, the call receiver can have a more complete picture of the machine state precipitating the call. Further options can be provided to the operator on the machine user interface to provide additional information, triggering an escalation process, and tags can be configurable for each machine or process. Each operator interaction with the machine user interface can be recorded or tagged and provided to the analytics engine for analysis.

Figure 2B:
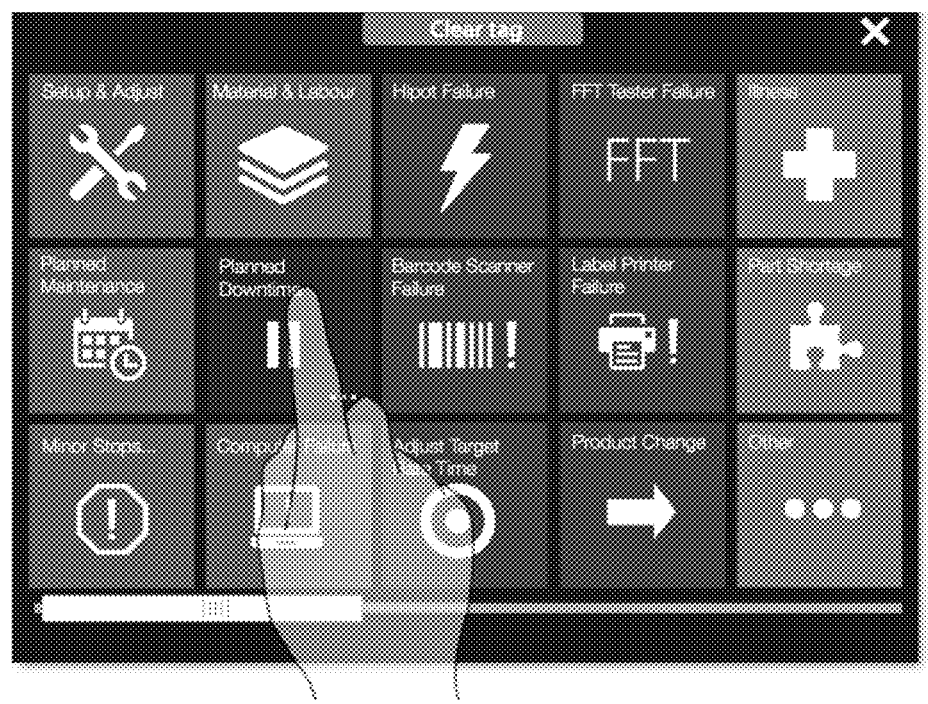
FIG. 2B is an example of a tag display on the machine user interface.

The machine user interface can also provide tags to query the operator on common occurrences to the industrial machine that have an effect on productivity. An example tag display on the machine user interface is shown in FIG. 2B. Tags can be arranged by highest occurrence or relevance and can be colour coded. If there are too many tags to fit on a single display, additional tag displays can be accessed by the operator, for example, using a swipe gesture on the machine user interface. Sample tags include but are not limited to: Setup & Adjust; Material & Labour; Mechanical Failure; Tester Failure; Planned Maintenance; Planned Downtime; Minor Stops; Computer Failure; Barcode Scanner Failure; Label Printer Failure; Adjust Target Rate Time; Product Change; Part Shortage; Rework Requirement (part requires additional processing); Quality Failure (e.g. scrap); Waiting for maintenance; Impending material shortage; Illness; Lunch/Break; Training; Town Hall Meeting; and Not Scheduled. Other tags or subtags relating to machine operation can include but are not limited to: Unknown noise; Excess heat; Excess vibration; Increased or Decreased power consumption; Erratic power consumption; etc. Generally, tags are associated with steps in the manufacturing process and classes of losses, e.g. planned vs. unplanned or scheduled loss, that contribute to overall process losses. The machine operator can input a tag at a particular time to signal that an event has occurred and the input tag can be later used to correlate with other events and provide prescriptive analytics for the machine and/or operator. The operator can also be enabled to input comments or a unique tag at the machine user interface. Once the operator has input a tag, a confirmation can be sent to the user interface to indicate that a tag has been recorded. The analytics engine can also provide tag prediction to the machine user interface based on historical and current use of tags and prompt the operator to confirm the predicted tag and/or return several tags ordered by likelihood. Similarly, the alert engine can provide tag prediction to the machine user interface based on satisfying trigger conditions, and optionally also send an appropriate alert. Tag input by the operator can be used to drive escalation of requirement or prioritization at the machine. Additionally, the machine user interface can provide productivity data to the operator. Without being bound by theory, it has been found that providing real-time productivity data to machine operators encourages and improves the productivity of the operator, especially when productivity is gamified.

Figure 3:
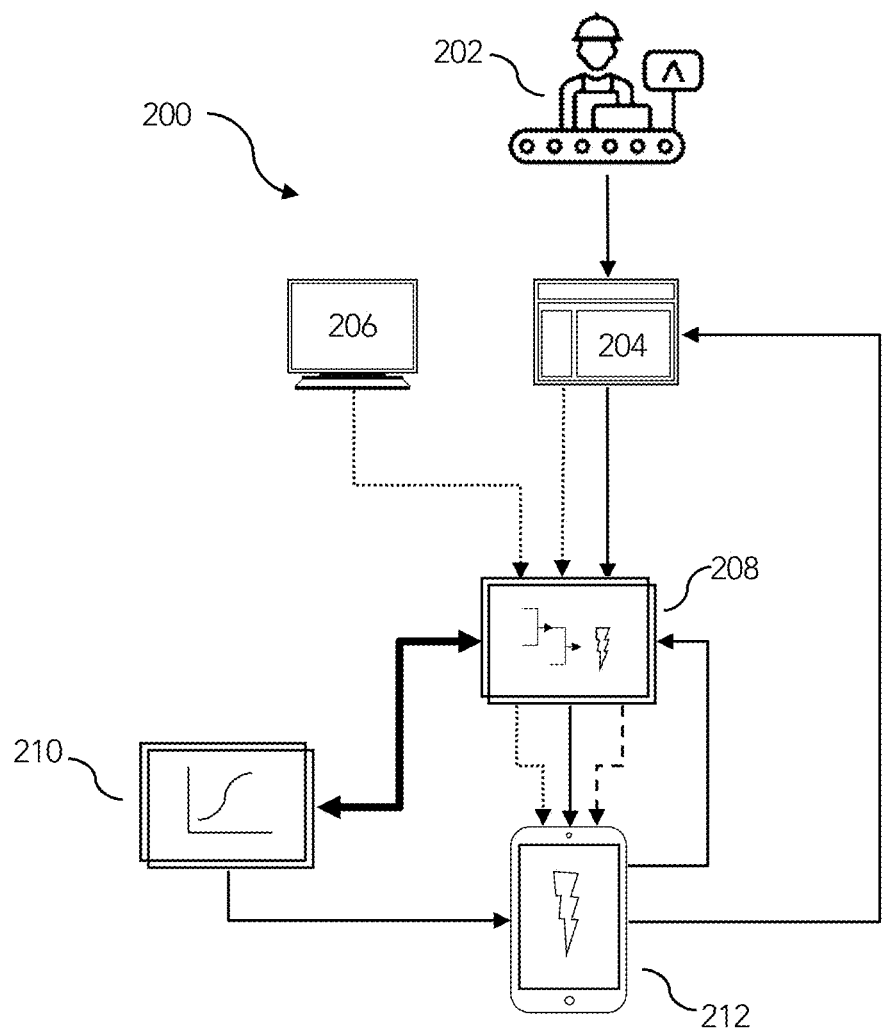
FIG. 3 is a flowchart depicting a method of data flow in the system.

FIG. 3 is a flowchart depicting a method of data flow in the system 200. A machine tap 202 collects raw performance data from a machine, such as a manufacturing or industrial machine. At the machine tap 202, a transformation step obtains data from the machine and transforms it into a stream of raw performance messages and data which can be later added to and analyzed. The raw performance data (shown as a solid arrow) collected from the machine tap 202 can include, for example, up-time, down time, counts, rates, and error codes, timestamping, measurements of specific signals such as power consumption, acoustic information, temperature, motion, light, sensor data, or a combination thereof. The raw performance data obtained at the machine tap 202 can also be presented to an operator on a machine user interface 204 for immediate observation by the operator. Additional context data (dotted line) can be obtained from the operator of the machine at the machine user interface 204, which can be used to set up and report SKU, task or operational information, and call for assistance. The context data can also include, for example, identification of the part being manufactured, step of manufacturing, identification of the operator at the machine, batch information, information about the task or operation being done by the machine (SKU task), information on the primary materials being processed by the machine, work order identification, or machine task in progress, raw performance data, or tags which describe the machine state at a particular time. The machine tap 202 can also concurrently collect machine performance data as the operator enters a tag by time and state at a machine user interface 204. Context data can also be obtained from a context tap 206, such as a computer, an enterprise resource system, server, database, or combination thereof, which contains further context data about the machine, operator, schedule, time and date, provenance of primary materials, or other context data regarding the machine or operation thereof.

Context data from the context tap 206 or as input from the machine user interface 204, referred to as the context stream, is further integrated and/or aggregated with the raw performance data to provide a tagged performance data stream or combined machine data stream. This combined data stream can also be referred to as a SKUed stream, as the raw performance data has been associated with a manufacturing part, process or SKU using the context data. The combined raw performance stream and context stream are transmitted periodically to an alert engine 208, optional through or on a server, which can be a local server, cloud-based server, or a server at any other location. Data can be transmitted periodically as a batch appropriate for the machine, such as, for example, every fraction of a second, every second, or once every few seconds or minutes, which can be set automatically or manually based on the machine or process. Alternatively, data can be transmitted as a stream with new data being transmitted immediately, or a combination of batch and stream depending on the acquired data.

At the alert engine 208, an algorithm translates the received raw performance data and context data and compares the data against a set of trigger definitions. Each trigger definition comprises a set of conditions which, if met, result in an alert. The alert engine 208 can monitor and process data in the data stream to test for each trigger definition. Each trigger definition can include but is not limited to: threshold met; threshold average over time; idle time; probability of occurrence of an event; impact of the event, e.g. potential or potential losses; and combinations thereof. For example, for each alert, a trigger definition determines when an alert is created, raised, and sent to the recipient. Each trigger definition can have various embodiments, which can include manually created rules, such as when the machine has been idle for longer than a particular period of time, such as more than a few minutes. A trigger definition can also be based on a combination of received data, such as if more than a particular number of machines in a network have been idle for more than a particular period of time, and if other alerts have been raised.

If the data stream comprising the raw performance data and context data satisfies a particular trigger definition, the alert engine 208 sends out an alert on an alert data stream (dashed line) which is sent to a remote device 212 to receive the alert. An alert generated by the alert engine 208 can comprise the content and/or conditions associated with the alert, and can also include a recipient and a medium of communication, priority of the alert, all of which can vary. The priority of the alert can be based on, for example, expected or potential financial loss, improvement initiatives of the company, proximity of responders, load on the potential responders, etc. Alerts can be sent to particular recipients, such as machine operators or maintenance workers, and prioritized to direct operator workflow to address each alert in priority order to maximize system efficiency. Should a further trigger condition for alerting a manager be satisfied, such as, for example, a machine idle state for longer than a given period of time, more than a certain number of machines are idle at a particular time, if an alert has not been responded to in an acceptable amount of time, or if an alert has been raised and closed by an operator in a short period of time, a manager alert can be sent to the manager to escalate attention to the condition affecting performance. In this way, trigger definitions can also include frequency and duration of alerts as generated by the alert engine 208, and indicators of process health and/or organization health can be monitored and brought to the attention of operators and managers for process improvement. The alert data stream itself can also be an input to the alert engine 208, meaning that alerts can be a further trigger to other alert conditions. In particular, observation of the alert stream, such as how often certain alerts have occurred in a period of time, can also trigger further alerts by the alert engine 208.

The raw performance stream, the context stream and the alert stream can be further analyzed by the analytics engine 210. The analytics engine 210 can provide curated analytics on the data stream to indicate trends or raw metrics on machine performance. Calculations in the analytics engine such as machine or operator performance over a longer period of times or comparisons between operators and/or machine performance and/or SKUed manufacturing process can also be compared. Machine learning pattern matching, interpolation, imputation, extrapolation, or generalization (predicting the likelihood of a pattern that has not been observed before but is drawn on previously observed patterns) based on historical performance can also trigger an alert, such as an occurrence that is predictive of a future effect on performance. Such an alert can be used to advise that there is a predictable possibility that a certain event or performance reduction will occur which can be preemptively addressed.

Given historical performance, the analytics engine 210 can predict the likelihood of unplanned downtime including, for example, the type, location and/or severity of a predicted or future downtime based on prior machine performance. The analytics engine 210 may also continuously predict performance at some point in the future, such as totals at end of shift/week/month and revise continuously until a particular endpoint, escalating prioritized tasks based on analytics data predictions. The analytics engine 210 can also identify low performing lines over a period of time, identify operator, SKU, changeover time, low performing machines, filling frequency vs. average, and analyze operator trends with type of product, to suggest process improvements to optimized operator performance. Event duration prediction such as anomalies (e.g. survival analysis for 2 minutes, 5 minutes, or longer) can also be done by the analytics engine 210 based on prior collected data, to anticipate calls and/or prompt to escalate earlier or do preemptive dispatch of maintenance or operator to a machine requiring attention. Analysis can further be done to set escalation thresholds, predict scheduling based on a learned model, and assign speculative/preemptive tasks based on inferred instantaneous workload.

Processes that are optimized can also be identified and compared with non-optimized processes, and the process characteristics of outperformers can be identified. These process characteristics can then be communicated to lower performers and adapted to improve the process performance of lower performers. In an example, changeover time can vary widely among different operators. Changeover time is the time is takes to change the machine operation from doing a first task to doing a second task, such as where two SKUs are involved, or there is a change of transformation from one machine operation to another. In a manufacturing environment where a single operator is responsible for multiple machines, machine changeover requires operators to manage their cadence to focus attention on the requirements of each machine to limit changeover time for each machine. Operators with faster changeover times (high performers) may be employing different techniques and internal scheduling that can be noticed and documented and taught to other operators, which can lead to overall faster machine changeover in an organization, and thus improved process performance. If the data shows that an operator is requiring extra time required for changeover, the documented operating procedure which has been shown to result in faster changeovers can be taught to the slower operators to reduce changeover time. Additionally, operators can potentially get increasingly reactive to downtime, meaning that if the operator is checking in on their machines with an optimized cadence, they will be more responsive when a machine is down or requires attention, reducing response time. Unplanned downtime can also be due to voluntary or involuntary gradual slowing of machine output. Unexpected downtime such as a machine break or when a machine requires immediate maintenance are handled by some operators better than others, and patterns in prioritization of unplanned machine events can lead to less downtime, which is trackable and can be patterned by the analytics engine 210.

Supervisor or manager route planning in the manufacturing environment such as movement of individuals on a manufacturing floor can also be tracked and analyzed by the analytics engine 210 in combination with a trackable device to monitor whether supervision is adequate at required areas on the manufacturing floor. If a specific area of the manufacturing floor has not been monitored in a threshold period of time, an alert can be sent to the supervisor to visit that location. In this way, alerts can be triggered such that a next task or ticket is presented to a supervisor based on process performance, individual operator performance, and supervisor proximity. A visual and/or sound alert can also be provided to supervisors on the manufacturing floor to direct supervisors to locations on the manufacturing floor where their attention is needed.

Factors that contribute to machine performance loss can include but are not limited to machine wear, substandard materials, misfeeds, jams, incorrect or non-optimized operator usage, and these can be observed by the analytics engine in terms of machine operation trends over time. Based on collected performance and context data, the analytics engine 210 can provide a prescriptive analysis to predict, anticipate, and provide guidance to reduce the occurrence and magnitude of a downtime event. Predictive data enables more rapid intervention to reduce magnitude of a downtime event. Based on previously collected data, the analytics engine can predict future events by quantification or estimating the magnitude of an anomaly, and predict the impact and reaction of operators to affect overall process performance. In this way, the analytics engine 210 can provide additional information to the alerts engine 208 to prioritize alerts that may result in greater loss in a manufacturing system. For example, in a situation with multiple events are happening simultaneously, such as if three machines are down in a group which are all the responsibility of a single operator, the attention of the operator can be prioritized in the order that affords the most productivity gain or least productivity loss and a prescriptive action or prescription can be identified that improves process performance to limit loss or contribute to productivity gain. Some examples of prescriptive actions that can recommended include but are not limited to scheduling of operator activities, specialized or directed operator training, scheduling of machine calibration or adjustment, schedule of materials supply filling, scheduling of meetings, and scheduling of operator planned downtime (i.e. breaks). An alert can be provided to the operator, manager, or supervisor indicating a prescription to improve process performance. The alert can include, for example, a text or image-based notice, a colour change on the user interface display, an alert light, alert sound, or combination thereof, to draw the operator's attention to the prioritized task, and other alarms or alerts can be suppressed until the higher priority tasks have been attended to. By providing an alert indicating a prescription to improve process performance based on data obtained by the machine and process, a tempo or cadence can also be provided for operator best practices.

Operator task analysis and prioritization based on manufacturing floor responsibilities of each operator can also be undertaken by the analytics engine 210. In one example, an operator is responsible for filling machine A with raw materials (eg. blanks for drill bits) every 8 minutes, doing a quality check for machine B every 12 minutes (eg. check that 10 quality pieces are produced), and replacing a grinding tool on machine C every 25 minutes. In addition, actions are required if, for example, machine B requires semi-regular adjustment to avoid manufacturing defects in the product, which should be noticed upon inspection of the machine products. Using the present system, the operators that have a knack for timing their attention during a shift are noticed by the analytics engine 210 by reduction of losses in machine downtime and fewer production defects, while the analytics engine can identify other operators who find it challenging to prioritize attention to machines and allow machines to unnecessarily idle or continue manufacturing substandard product. By observing and timing the attention, cadence, and processes of superior operators to reduce downtime and improve process performance, other operators can be trained in process flow to respond to machines for optimized performance.

Learned models can also be used in the analytics engine 210 to suggest process performances. Prescriptive actions can be recommended to, for example, shorten operator reactivity time and affect process performance. Some other prescriptive actions that can be recommended are, for example, adding, removing, or switching machines or operators, changing machine geography or layout on the manufacturing floor, or changing buffer size or location. These prescriptive actions can, in an analysis, also be shown to lead to process gains. Potential losses due to in-progress or imminent downtime events can be reported, as well as or in addition to potential savings if the situation is responded to immediately. Similar events can also be observed across multiple organizations and resolutions shared. In another example, if the system models that each of nine machines needs twenty minutes of attention during a shift and a single operator is responsible for the nine machines, prescriptive action can be recommended such that an operator can be scheduled to include twenty minutes of maintenance for each machine during the shift. If the system notices that the twenty minutes of machine maintenance has not been done for any given machine due to, for example, a predicted or unplanned downtime, further machine unplanned downtime can be prevented by allocating another operator to attend to the machine requiring attention and identifying a prescriptive action such as a schedule change or schedule recommendation or operator allocation to address the prescriptive action. In this way, the system can notice interference and reallocate tasks to the set of shift operators to ensure that operators have reasonable workload and that tasks are timely completed to prevent unplanned downtime and improve process performance.

The remote device 212 can be a computer terminal used by a supervisor or administrator, a mobile device used by a manufacturing floor supervisor, maintenance worker, or machine operator, or any other remote device capable of receiving an alert. The remote device 212 can also be a simpler form of alert, such as a light at the machine which turns on at the machine when an alert is generated, with the light having either a wired or wireless (wifi) connection to the alerts engine 208. Alerts can also be sent to the machine user interface 204 to advise the machine operator that an adjustment needs to be made for immediate action or if an action taken by the operator is expected to result in improved productivity. Analytics data generated by the analytics engine is also sent to the alert engine 208 (bold arrow) to be further evaluated by the trigger definitions.

If the alert engine 208 sends out a mobile alert, a response request can also be sent concurrently to the remote device 212 or machine user interface 204; if the alert receiver does not respond to the response request within a certain period of time, the alert engine can send out another alert to another mobile device, such as that of a supervisor or maintenance personnel, for immediate response. In this way important alerts pertaining to performance can be addressed so as to address potential or predicted disruptions or slowdowns in machine performance, providing a robust escalation chain to ensure that alerts are responded to promptly. The metrics on how the escalation chain functions, i.e. how quickly alerts are responded to, can further be used by the analytics engine to provide feedback on the response process and health of the response chain.

Actionable insights generated by the analytics engine can also be displayed at the remote device including analysis to provide clear metrics, actionable steps, and prescriptive analytics for improving process performance. At the display of the remote device a user can access the data provided by the analytics engine via an analytics interface for a deeper view of the prescriptive analytics. Various views can be available for displaying a selection of process performance data metrics, and default views can be provided. Pre-defined views can also be available for selection which generate, for example, a chart, graph, or other data display.

Figure 4A:
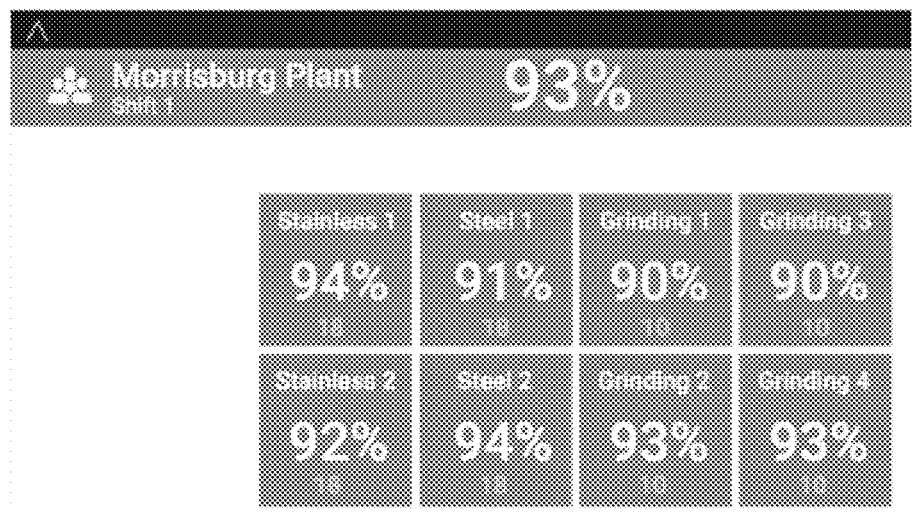
FIG. 4A is a set of process performance data selected by location.
Figure 4B:
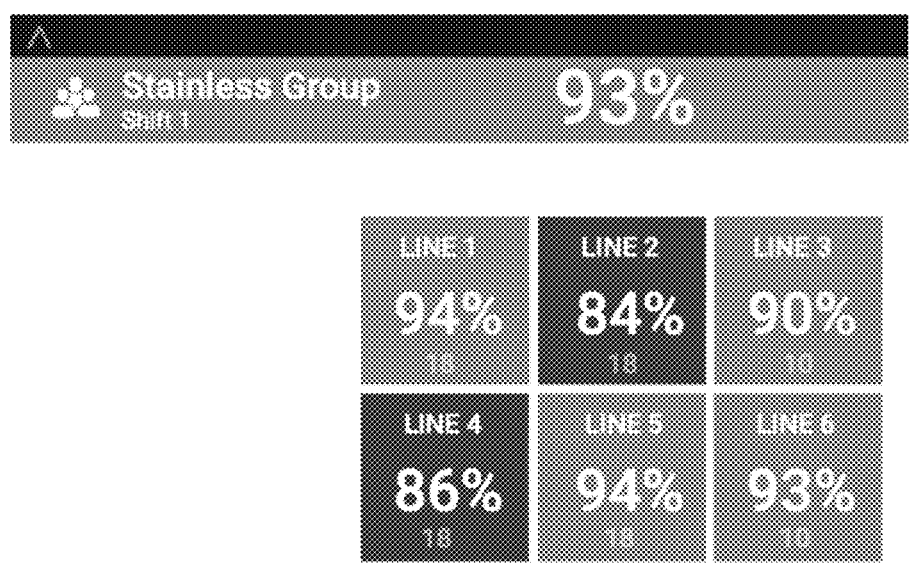
FIG. 4B is a set of process performance data selected by process.

FIG. 4A is a set of process performance data selected by process. This gives a plant level overview summarizing the current state of each of the high level groups within a plant. The groups shown in the example of FIG. 4A include Stainless, Grinding, Steel, however the groupings may be directed to other manufacturing functions such as, for example, Assembly, Welding, Plating, or other specific products lines. Each high level group comprises a set of groups grouped by, for example, interaction, proximity, task, or other grouping. FIG. 4B is a set of process performance data selected by location, which is a group selection from a high level group. A plant manager or supervisor can have a quick view of the overall productivity of any group or subgroup.

Figure 4C:
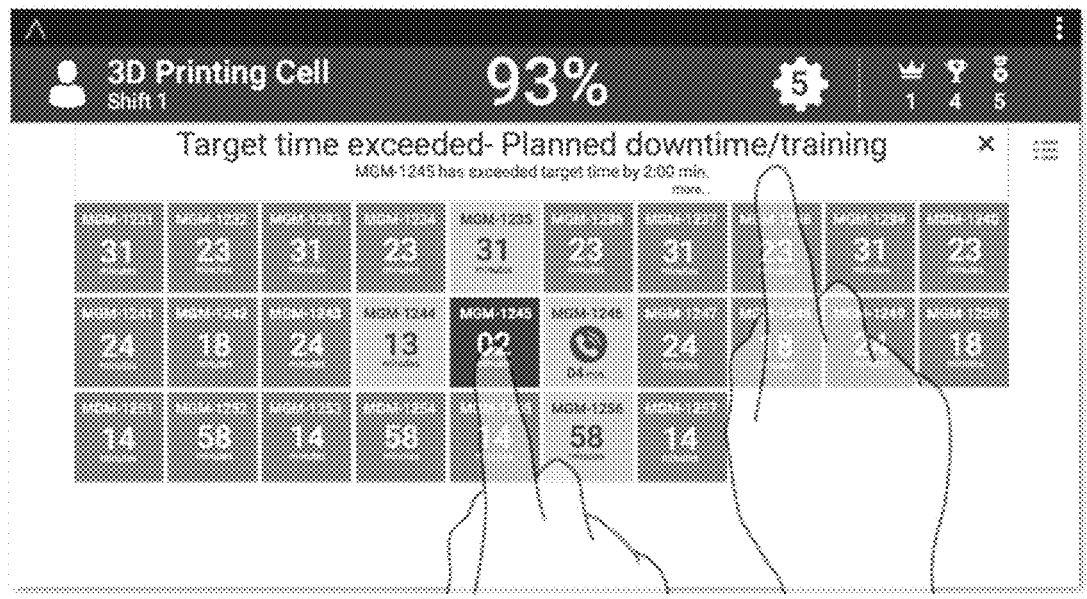
FIG. 4C is an example heatmap of the productivity of a selection of machines on a manufacturing floor.

FIG. 4C is a group overview that shows a heatmap of the productivity of a selection of machines on a manufacturing floor, with well-operating machines shown in green on a screen (medium-gray in FIG. 4C), machines that are underperforming but that don't require immediate attention shown in yellow on a screen (light-gray in FIG. 4C)) and machines requiring immediate attention in red on a screen (black in FIG. 4C)). The machines can be in the same or different locations, and the machines' process performance can be viewed by the supervisor in particular sets, for example, OEE for a particular process, geographical location, machine type, machine process, etc. The machine groups can be arbitrary, and can further comprise groups of groups. The heatmap is preferably a real-time display of machine performance displayed on a remote device or machine user interface to provide supervisor with immediate feedback on industrial process performance for every machine on a manufacturing floor or in a manufacturing organization. In one example, an alert can be presented to a supervisor if a single machine is placed into an inefficient state by changing the colour of the machine indicator. The supervisor can then respond to the alert notification to direct appropriate action to address the inefficiency, such as, for example, visiting the machine, directing maintenance personnel to the machine, advising the machine operator to make an adjustment to the machine, or reallocating human operator resources. Overall process productivity measures, e.g. OEE, can be calculated and instantaneously adjusted based on machine performance at each location on the manufacturing line. Real time and prescriptive alerts can also be pushed to operators on their mobile or remote device or computer so that they can respond as required, for example to decrease downtime.

Figure 5:
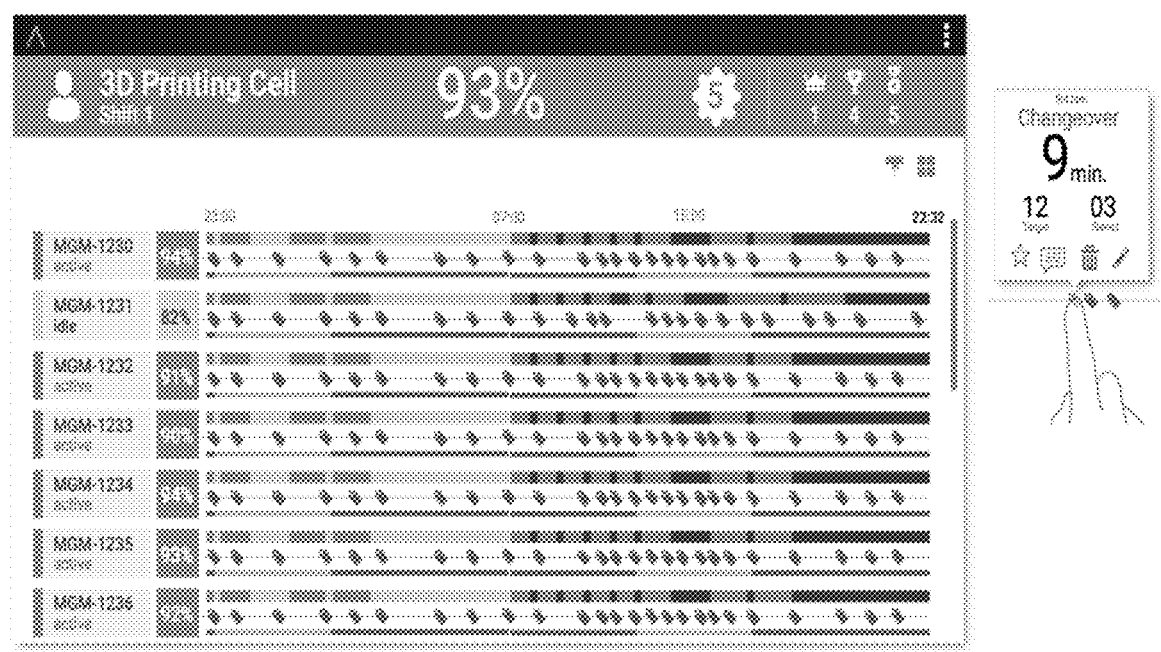
FIG. 5 is a supervisor user interface displaying a selection of machine operational data including tag inputs for each machine and individual tag identification.

FIG. 5 is a supervisor user interface display showing machine operational data for a plurality of machines including operator tag inputs for each of machines MGM-1230 to MGM-1236. The list of machines shown are, in this example, machines run and maintained by a single operator on a shift. As shown, MGM-1231 operating at 82% shows significant downtime compared to other machines, and can be shown in a different colour to alert a supervisor. An individual tag identification selected from one of the tags on the main display is shown on the right, with a nine-minute changeover and the time of the changeover.

Figure 6:
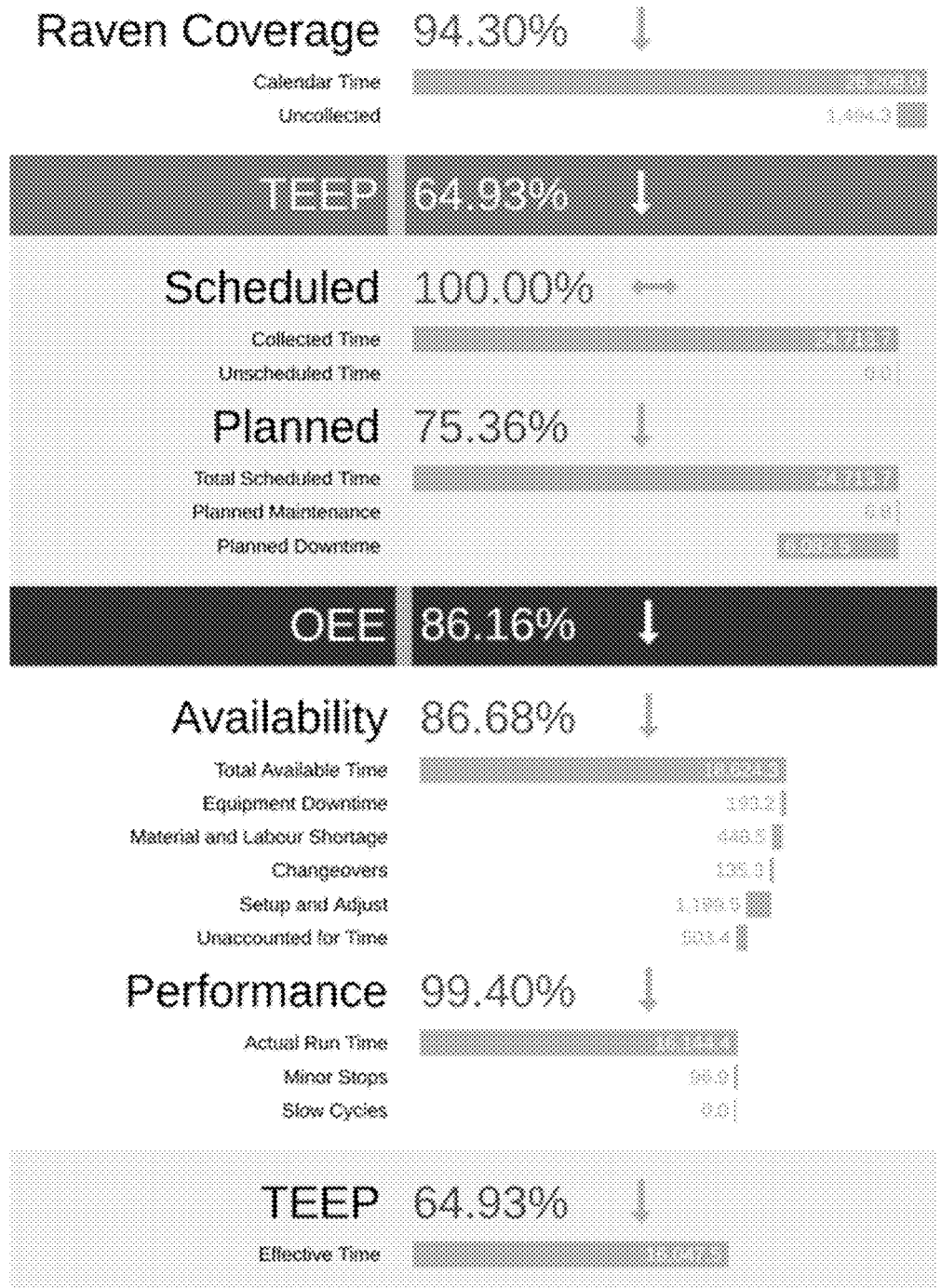
FIG. 6 is an OEE waterfall analysis.

FIG. 6 is an OEE waterfall analysis accounting for equipment downtime, material and labour shortage, changeovers, setup and adjustment time, and unaccounted for time. Differentiating between planned machine downtime and unplanned machine downtime enables the calculation of OEE to exclude planned downtime events in the overall efficiency calculation. Machine OEE also depends on, for example, the type of product being manufactured, machine time active, machine time idle, machine time running slow, actual counts vs. target count, skill of machine operator, response time of operator (where a single operator is operating more than one machine), supervisor support, and location of supervisor in the manufacturing environment. The tagging of machine events during manufacturing enables more granular diagnostic of where in the OEE productivity is being lost. Losses are factored in to calculate overall process performance relative to total available time, with data on the losses extractable for improvement based on the type of loss. Understanding the loss in a manufacturing environment using a combination of analytics, machine performance data and context data enables a deeper view of the OEE of where losses are occurring such that sources of loss can be identified and addressed to improve the OEE. In practice, analysis of the OEE can be done by anyone in the manufacturing environment, including but not limited to a supervisor, process engineer, or plant manager.

Figure 7:
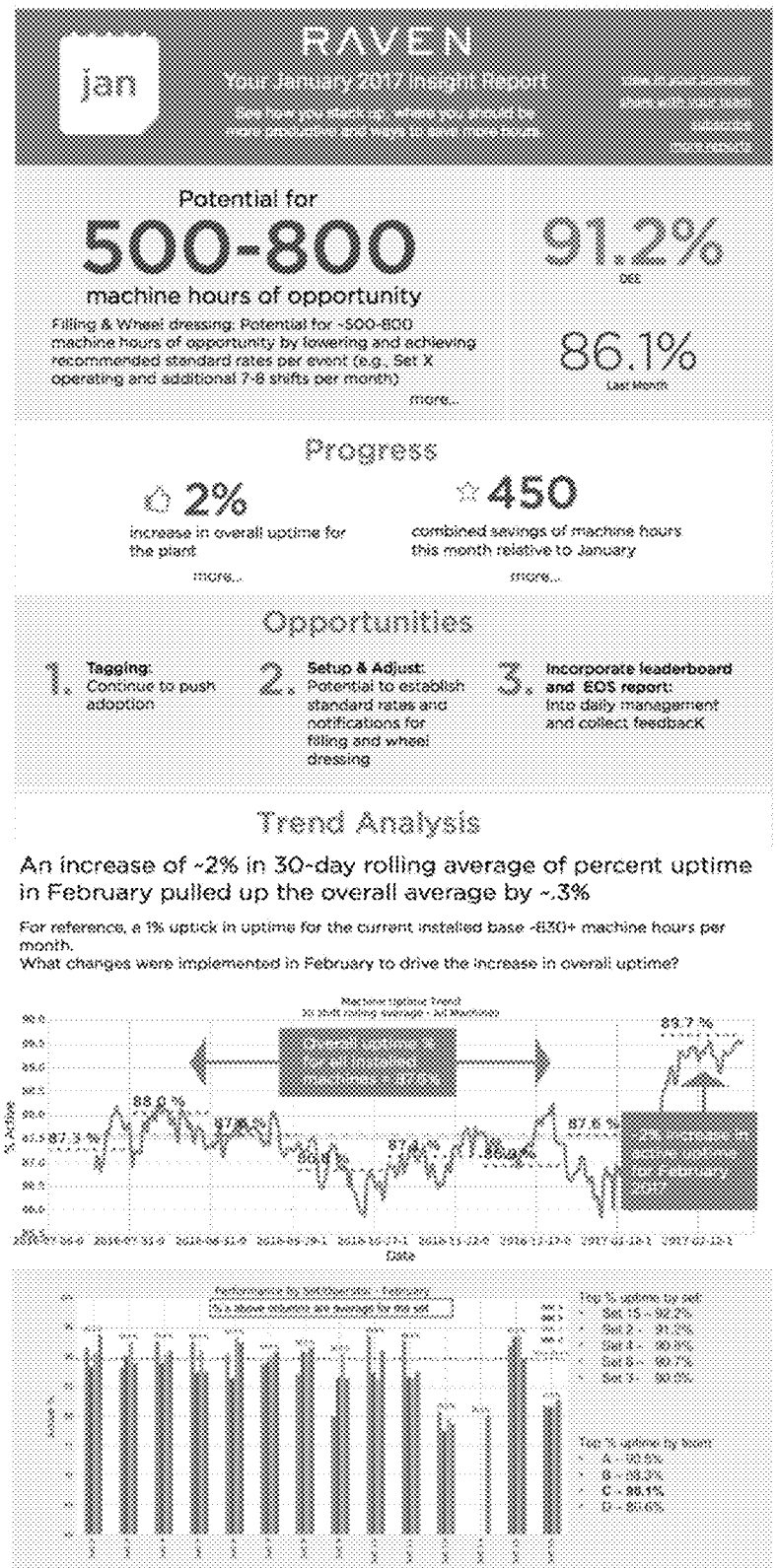
FIG. 7 is a data analytics display summarizing industrial process performance.

FIG. 7 is an example data analytics synopsis or insight report summarizing industrial process performance and providing actionable information. The insight report is biased for action and makes tangible recommendations on improving process performance and how the recipient can improve their business. The insight report can provide action items as well demonstrate the progress of process performance improvements over a period of time as an indicator of the contribution of the prescriptive analytics system to measurable performance improvements. The report and associated data can be generated by the analytics engine and output to a graphical user interface (GUI), and provided on a website or over email, SMS, or other communication system. Access or links to deeper analysis and direction can also be provided for managers or supervisors who desire additional information. For example, supervisors can click on part of a chart/ report and the system can automatically suggest other reports, views, charts, pivots, notables, trends, anomalies, or alternative data displays. Problematic points can be identified and actionable next steps can be provided to supervisors to improve individual and overall process performance. Some recommendations include pushing tagging adoption to increase data collection, changing and standardizing setup and adjustment procedures, and incorporating leaderboard and end of shift (EOS) report. Reports can be generated based on instantaneous machine or manufacturing floor state, periodically during a shift, at the end of a shift, or at the end of a time duration such as a week or month, for example. Individual groupings of teams or SKUs or shifts can also be prepared to compare process productivity of supervisors or groups of operators or machines. Individual operator reports can also be provided to supervisors outlining productivity, amount of downtime, mean uptime, and teams or groups can be aggregated to provide overall OEE for each team or process.

Figure 8A:
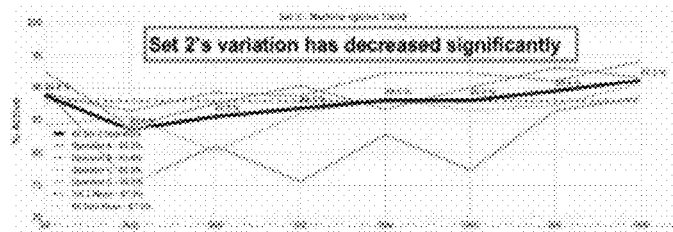
FIG. 8A is a data analytics display summarizing industrial process performance.

FIG. 8A is an example data analytics display summarizing industrial process performance for groupings or sets of operators. In addition to alerts, analytics can be sent to a remote device from the analytics engine for reporting, including providing actionable insights for supervisors and/or operators for improving process performance.

Figure 8B:
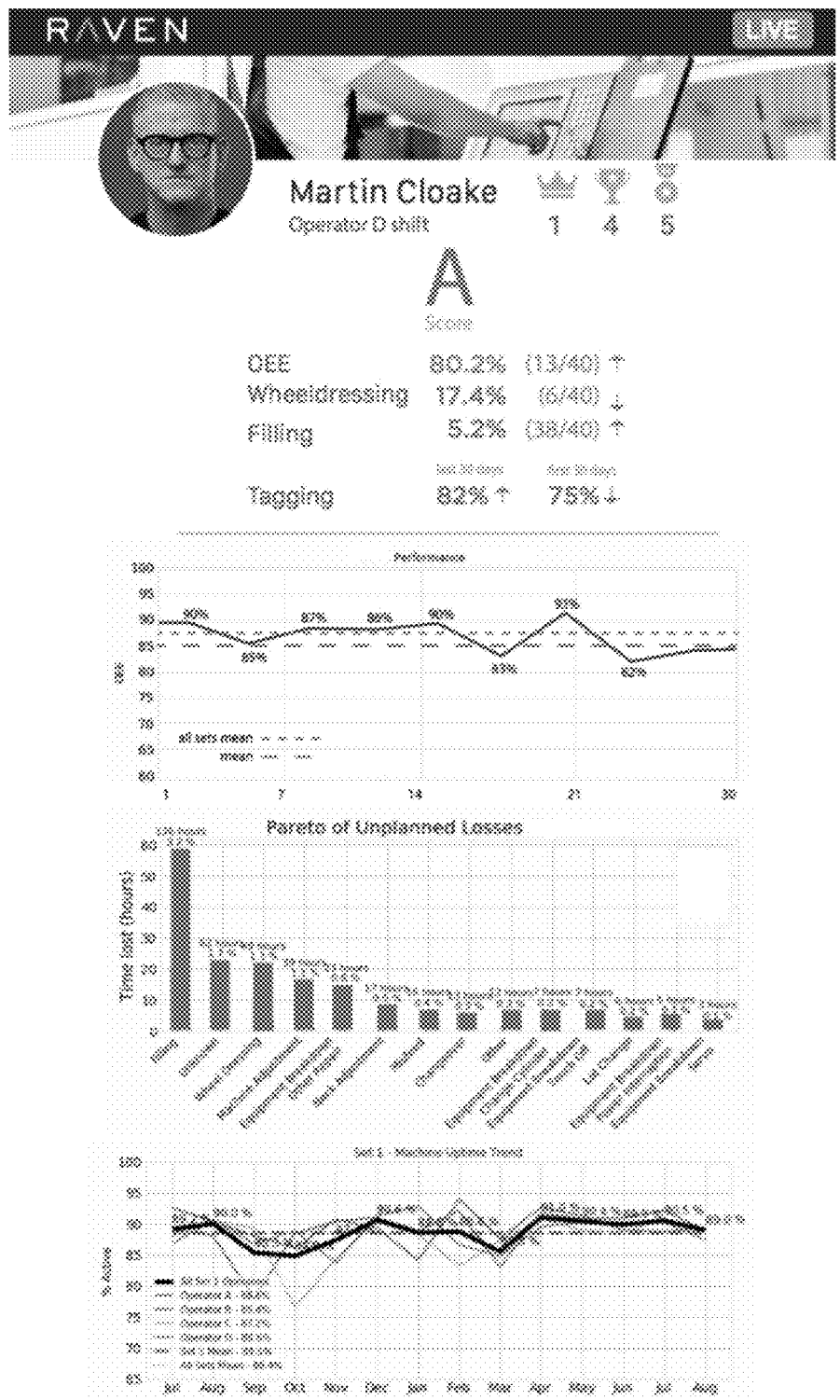
FIG. 8B is an example of an individual performance score card.

FIG. 8B is an example of an individual performance score card. This report is tailored to an individual and provides a high level summary of metrics currently considered important to the business that the individual is responsible for. This report can be generated for view by the individual operator, a supervisor, manager, or anyone within the organization who has a role in productivity. The report can show a summary of awards, provide an overall performance score, and show a ranking against other operators for those metrics, as well as the high level trend for their performance. Additionally, the individual performance score card can show detail about certain metrics, such as OEE over time in order to show the operator's performance over time and to compare their typical performance to similar operators, such as operators working on similar machines or working on a similar process. Without being bound by theory, it has been found that quantifying industrial process performance in augmented industrial management and providing the analytics to operators and supervisors can motivate all levels in an industrial organization to change behaviour to improve output quantity and quality. Augmented industrial management has been found to improve productivity and profitability in industrial environments by generating analytics data and alerting machine operators and/or supervisors when a machine or process requires attention. Alerts that attention is required provide early indication that a machine or operator or process is operating inefficiently, could be operating better, is at risk of failure, or is in need of or would benefit from corrective action or maintenance. Analytics of both machine and operator performance metrics can provide information on, for example, autonomy, operator machine mastery, community or team behaviour, and these observations can be correlated with process performance and applied to prescribe a modification to improve process performance, such as, for example, to optimize the machine, operator, and/or team performance by triggering alerts about machine slowdowns or inefficiencies that can be rectified and result in a positive change in the overall process performance or industrial efficiency of the organization. In this case, OEE is a high level metric that can be compared to the OEE of the same operator at a different time, and to other operators performing a similar task. The pareto can be broken down into losses for the individual operator that can be compared to the pareto of the same operator at a different time, and to other operators performing a similar task. In one example, analytics data can identify individual operators with a slower than average operator speed for, for example, running, adjusting, or calibrating a machine, where additional operator training would result in improved machine operation mastery. Allocation of resources to training individual operators on the particular skill requiring training results in targeted operator performance improvement and improvement and optimization of training resource expenditure. On the machine side, analytics data can provide an early identification of machine inefficiencies, such as, for example, increased time between required calibrations or adjustment, increased running speed, increased noise or vibration, or general indications of abnormal or sub-optimal performance. Early identification of sub-optimal machine performance by the analytics engine can queue the machine for maintenance through an alert for calibration or maintenance to improve machine operation thus raising overall machine productivity over time. It is noted that patterns of inefficiency in both operator performance and machine operation are often not noticeable to either the operator or supervisor until there is a significant difference in operator or machine performance compared to normal, and by combining performance data and context data the analytics engine is capable of identifying inefficiencies at a stage far earlier than would be observable by a human.

Further, providing the data combined with competitive incentives to operators and supervisors to gamify the inputs to improve outputs has been shown to be highly motivating to individuals to increase process performance. For example, reducing the time to a tagging event by an operator can mean that a maintenance call happens faster, lowering overall downtime of a machine. By gamifying the rapidity of inputting a tag by an operator to the machine user interface, an operator can be incentivized to score 'extra points' which has a direct effect on industrial process performance. Points can be provided in the form of stars, coins, etc., and the manufacturing game to increase outputs works in real time to motivate operators to address issues as they arise, having a real world effect on improve manufacturing process outputs. In another example, operators can be presented with a challenge, such as being given an allotment of time to deal with an issue, and bonus points if they resolve the issue faster, with data collected on response time and issue resolution time. Response times can also be used to measure health of operators, determine when and how often and for what amount of time supervisor reports are read, record when standard work such as team meetings are occurring, and provide deeper usage analytics into process performance. In a situation where an operator is responsible for multiple machines, tasks can be further prioritized based on the analytics engine to direct the operator to prioritize issues that have a greater effect on productivity. Leaderboards and individual performance analysis can also be displayed to operators to motivate individuals to reduce time for controllable operations, such as filling and response time.

FIG. 9A is a display of performance analysis with gamification for an individual operator on a mobile device, and FIG. 9B is a display of performance analysis with gamification for an individual operator on a display screen. Social recognition in the form of public acknowledgement can also be provided when an operator does something well, which can promote competition, congratulations, and individual performance gains.

Figure 10A:
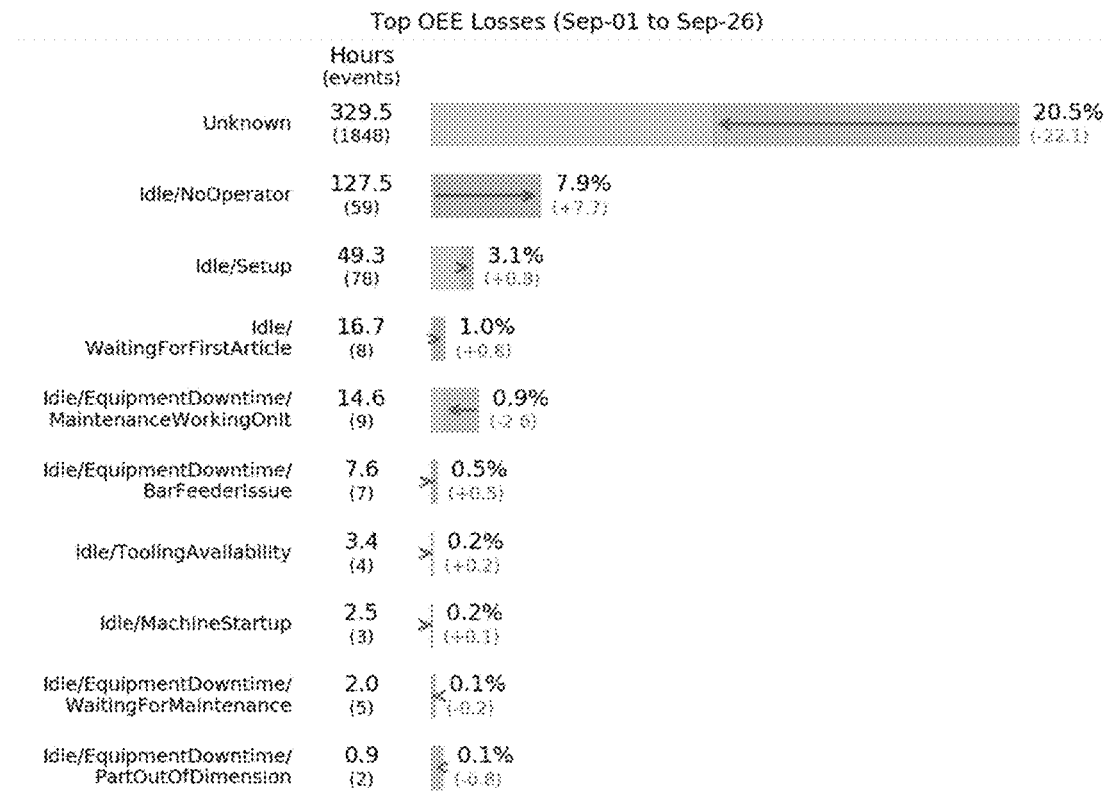
FIG. 10A is a bar graph analysis of top OEE losses.
Figure 10B:
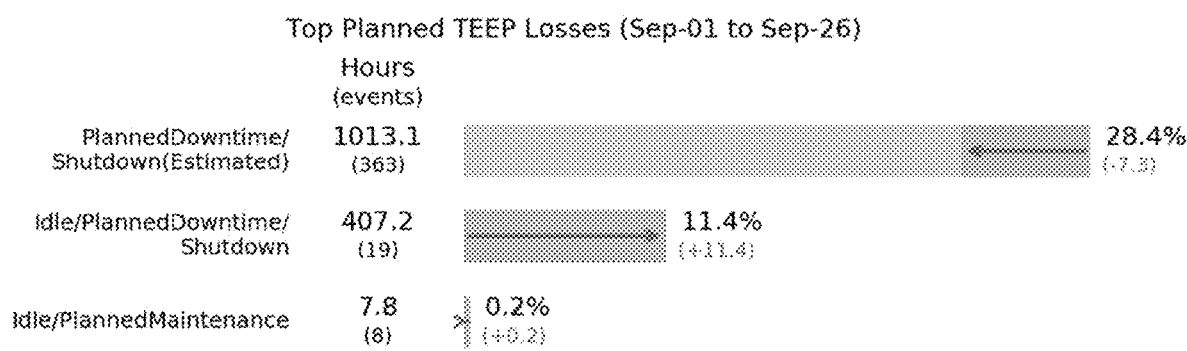
FIG. 10B is a bar graph analysis of productivity metrics.

FIG. 10A is a bar graph analysis of top OEE losses for an operator, machine, group of operators or group of machines compared to another operator, machine, group of operators or group of machines. This analysis shows the largest losses and can show the difference in those losses comparing the performance of the individual or group compared to the same individual or group at a different time or different individual or group. In this case, the arrows show the difference between the two metrics being compared, and the direction of the arrow is indicative of a loss or gain for that metric. Providing insight into losses or gains an operator, group or supervisor can be biased to act on each identified loss to improve productivity. FIG. 10B is a bar graph analysis of productivity metrics showing top planned TEEP losses. The productivity metrics shown in FIG. 10B demonstrate a case where it is unclear whether the effect of the difference on productivity is positive, negative, or desirable. However, analysis of these metrics compared to other individuals or groups can be helpful at deconstructing productivity and providing guidance for future gains.

Example 1: Manufacturing Process Performance

The present system was applied to a company that manufactures dental equipment and consumables. Standard rates and notifications for filling and wheel dressing were established and correlated with downtime and operator input tags.

Figure 11A:
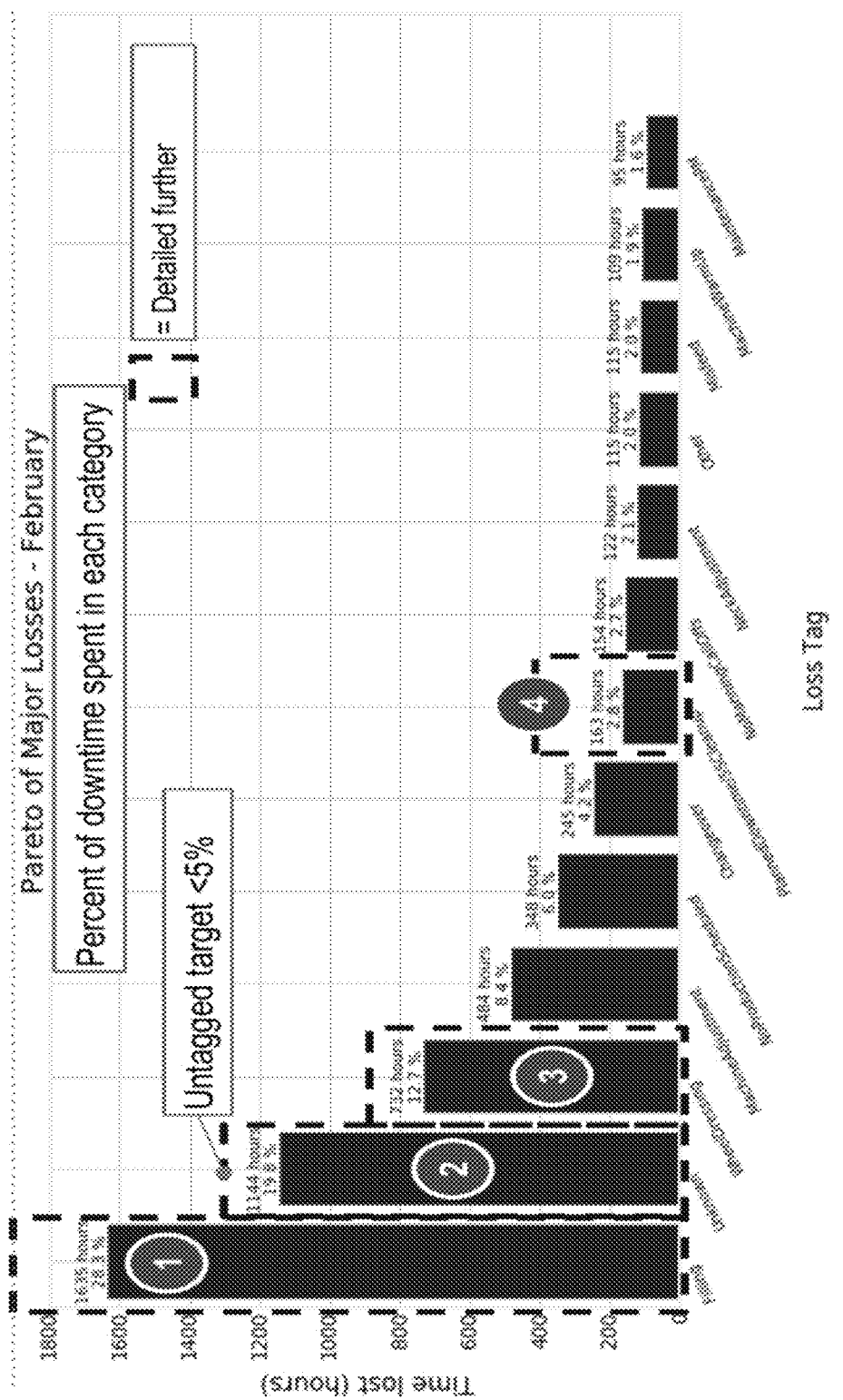
FIG. 11A shows a graphical pareto analysis of losses for a month.

FIG. 11A shows a graphical pareto analysis of losses for the month of February. The top February loss categories are: 1. Filling; 2. Unknown; and 3. Wheel Dressing, with 5S cleanup also highlighted. Tags input by the operator accounting for loss include filling, wheel dressing, machine adjustment, no production scheduled, changeover, planned downtime or 5S cleanup, no manning call offs (someone didn't show up), neck adjustment, misfeed, machine warmup, maintenance and other. As seen, untagged and therefore unknown downtime accounts for 19.8% of total downtime. As the percentage of operator tagged downtime improves, the accuracy of assigned downtime hours improves and the better the OEE information will be. It is noted in particular that machine filling accounts for 28.3% of the downtime with a total of 27,748 operator filling tags recorded for the month of February. Accordingly with the knowledge that reducing filling time can result in higher OEE, implementation of mechanical improvements to the filling operation is expected to result in loss drop for filling and cause a commensurate drop in machine downtime.

Figure 11B:
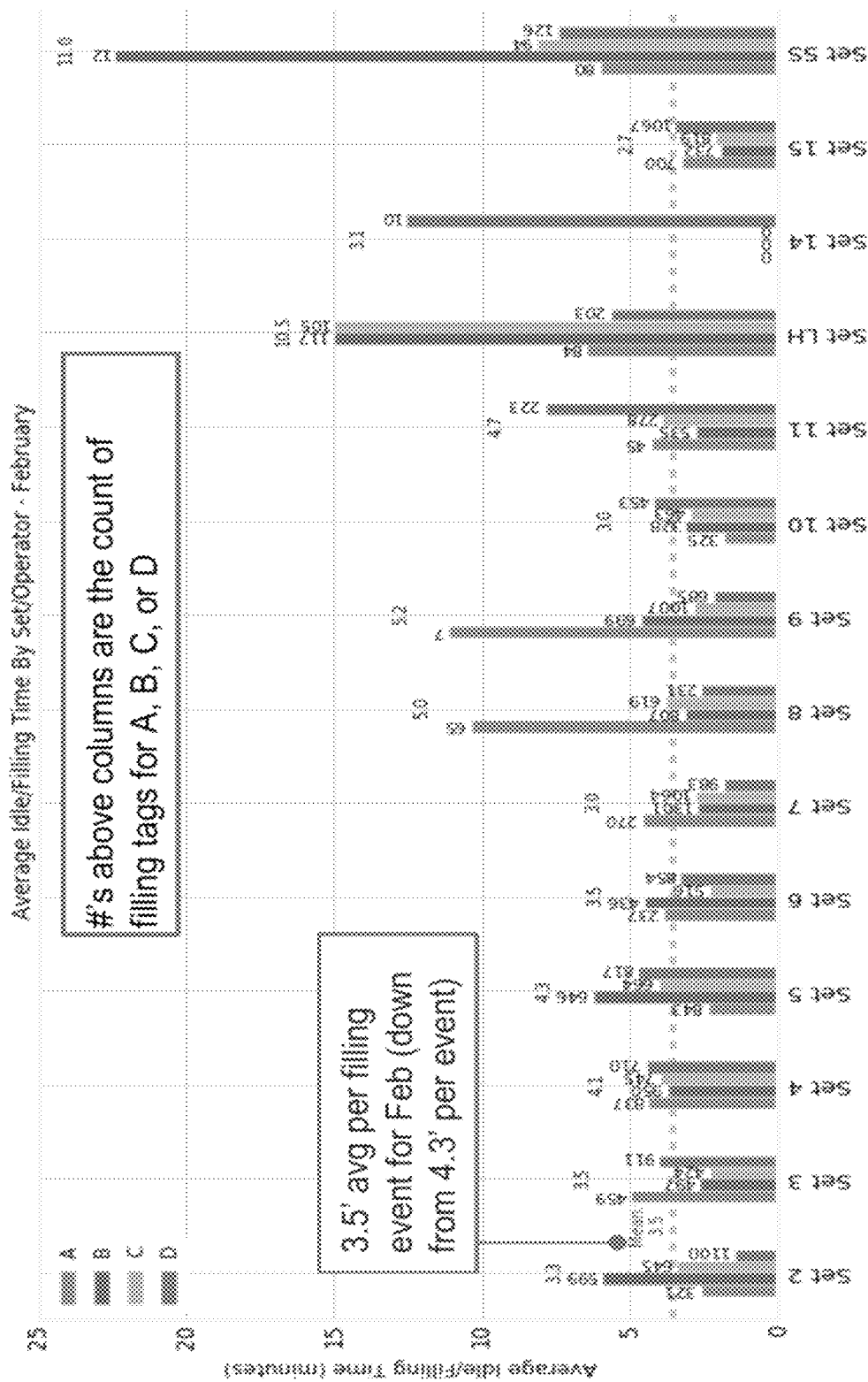
FIG. 11B is a graph of mean filling time by set or operator.

FIG. 11B shows a graph of mean filling time by set or operator after process improvement. The drop in mean filling time was reduced from 4.3 minutes to 3.5 minutes per operator over this period, with 30% of operators having an average of less than 3.0 minutes per filling saving a total 370 machine hours for the organization.

Figure 12:
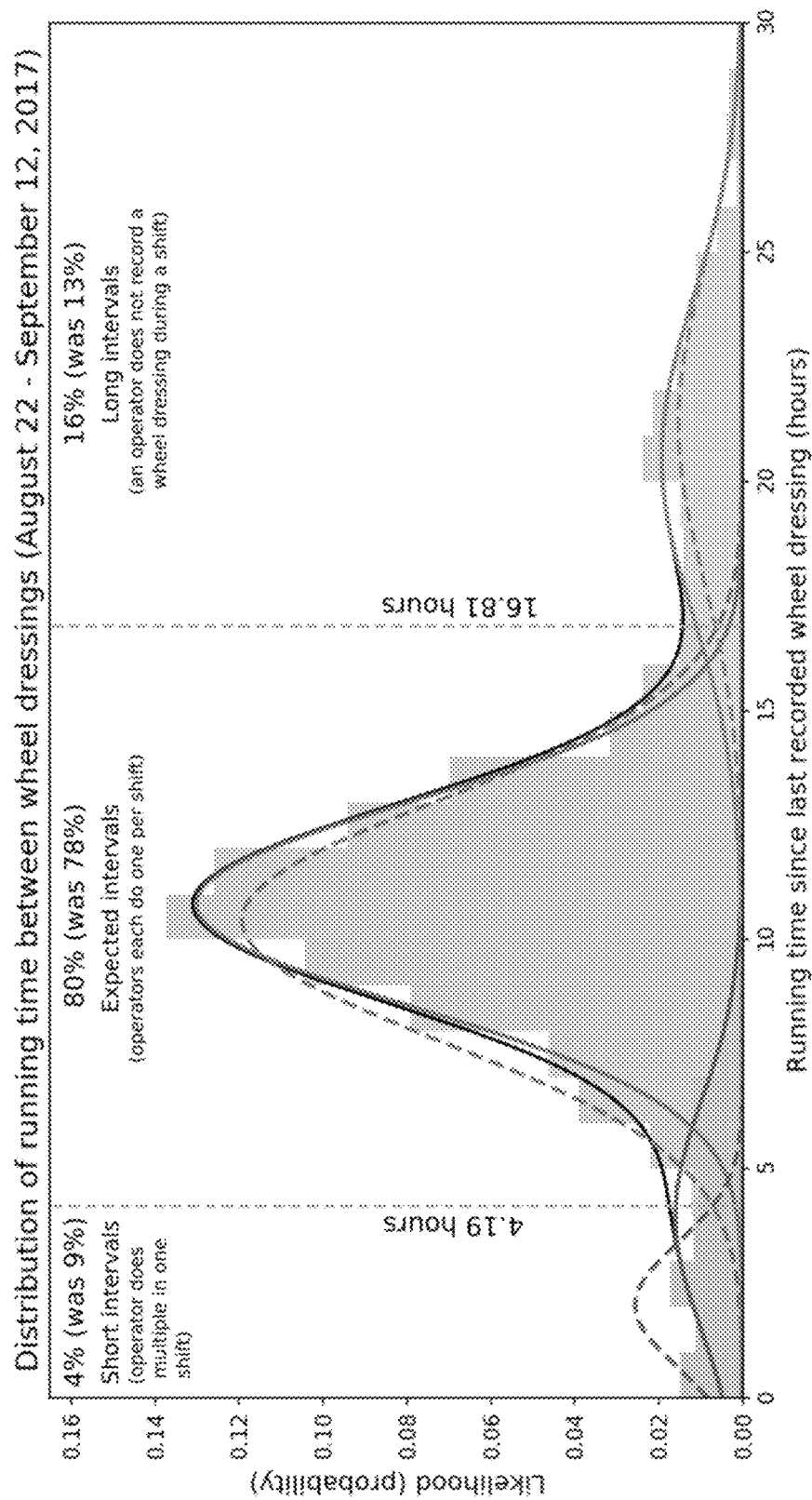
FIG. 12 is a graph showing distribution of running time between wheel dressings.

FIG. 12 is a graph showing distribution of running time between wheel dressings. As shown, the incidence of short intervals was reduced from 9% of wheel dressing to 4%. The spacing between wheel dressings is also more consistent.

Figure 13:
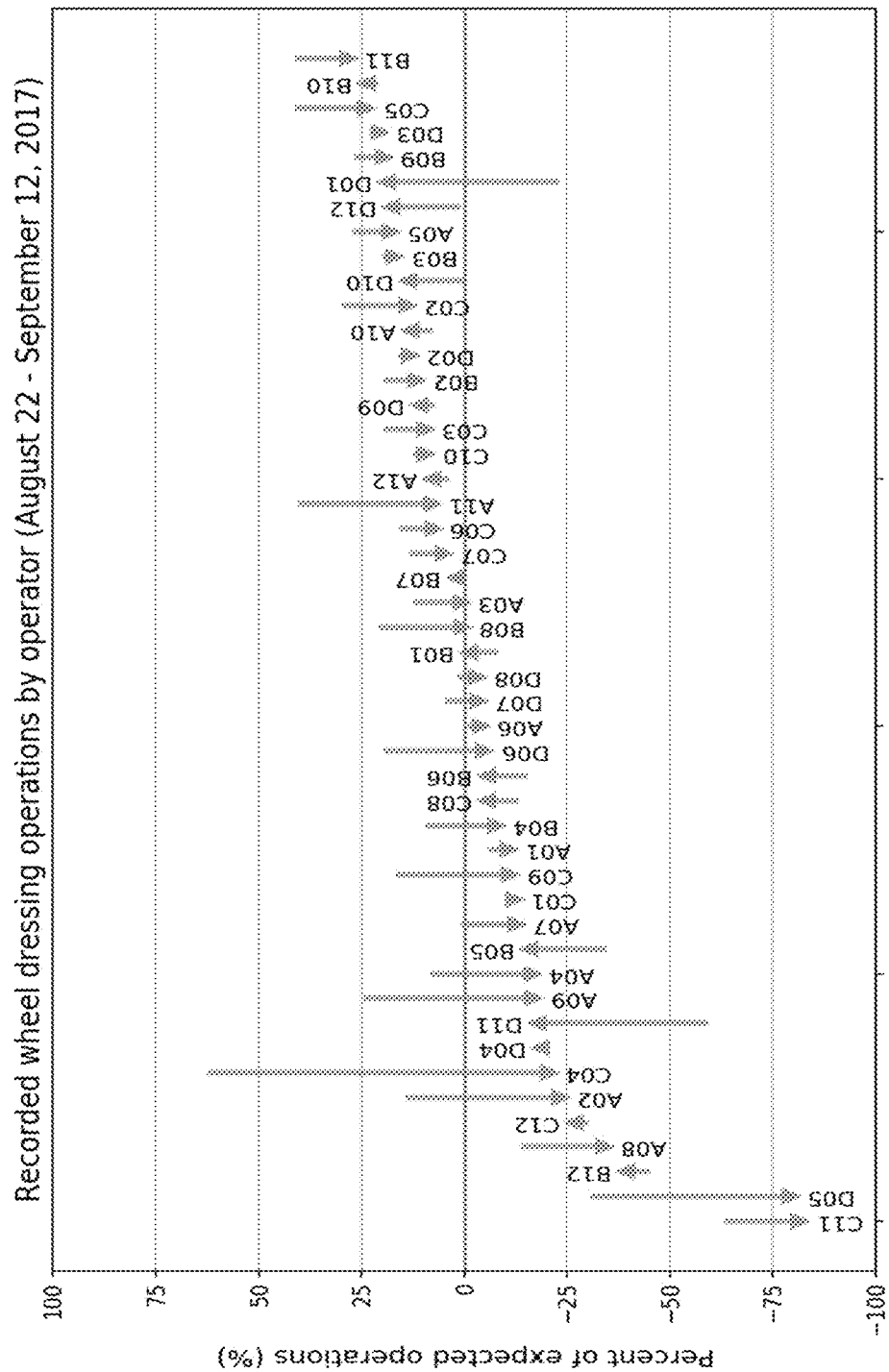
FIG. 13 is a graph of recorded wheel dressing operations by operator.

FIG. 13 is a graph of recorded wheel dressing operations by operator. The percentage of expected number of wheel dressings was also recorded. The base of the arrow shows the previous rate and the tip shows the rate between August 22 and September 12. For any given machine or process, an expected frequency of actions over a time interval is compared with the actual number of actions carried out by the operator. A comparison can be done over two time intervals can also show the change in percentage of expected actions completed between the intervals. Actions taken by the operator include maintenance, tagging, filling, and other operator requirements.

Figure 14:
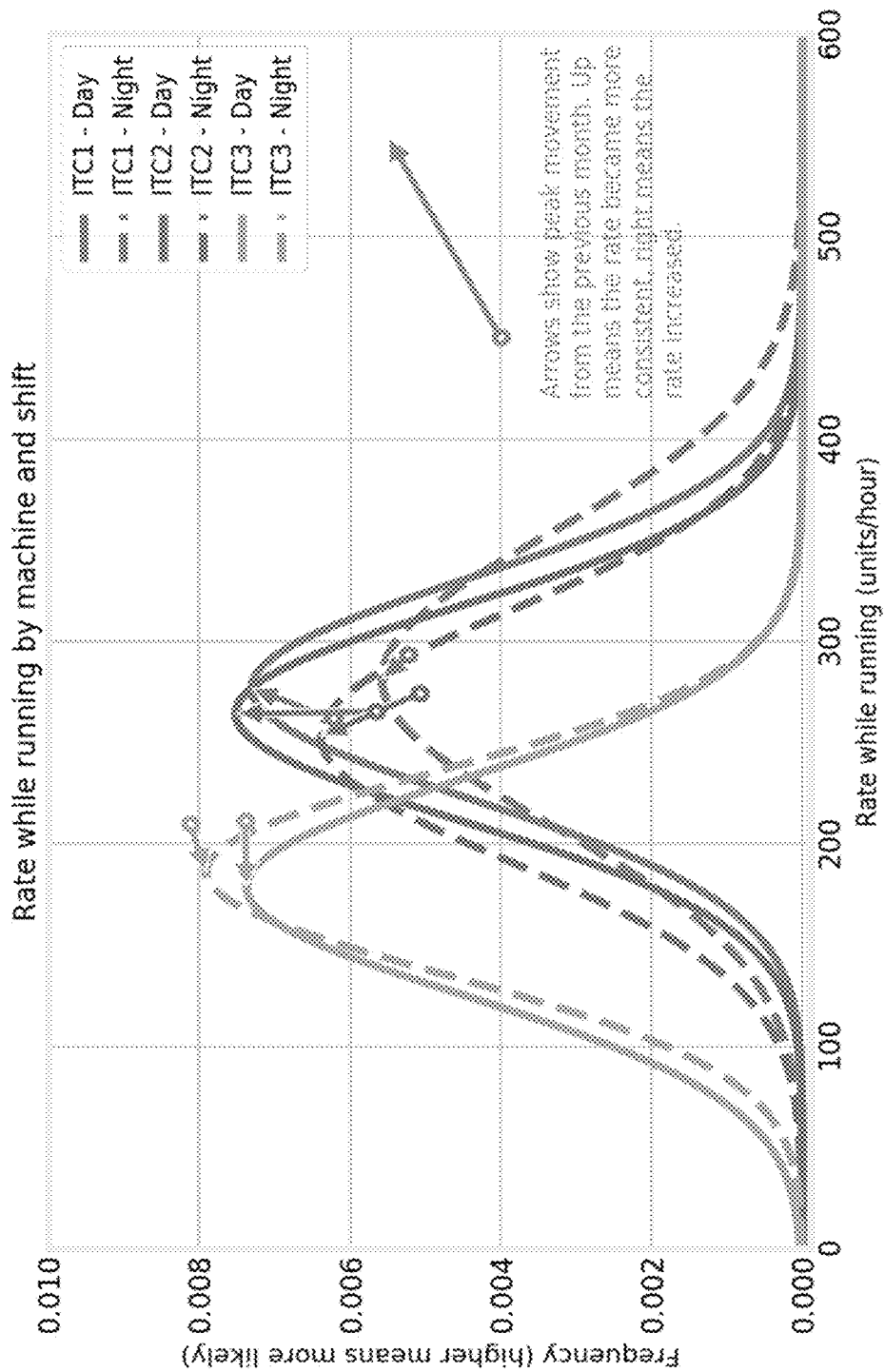
FIG. 14 is a graph of rate while running by machine and shift.

FIG. 14 is a graph of rate while running by machine and shift. This chart shows the distribution of rate while the machine is producing (i.e., the instantaneous rate). The instantaneous rate is faster than the average rate because it does not average across downtime. The arrows show how the peak of the rate distribution curve has changed. The area under the curve is always 1, so the x,y location of the peak entirely defines the curve. The peak moving up will make the curve narrower and implies more consistent rate. The peak moving right implies faster rate. Generally, up and to the right is better, which is higher consistency and higher rate. As shown, ITC 1 and ITC 2 generally got more consistent, whereas ITC 3 remained at the same level of relatively high consistency, but trended slower.

Figure 15A:
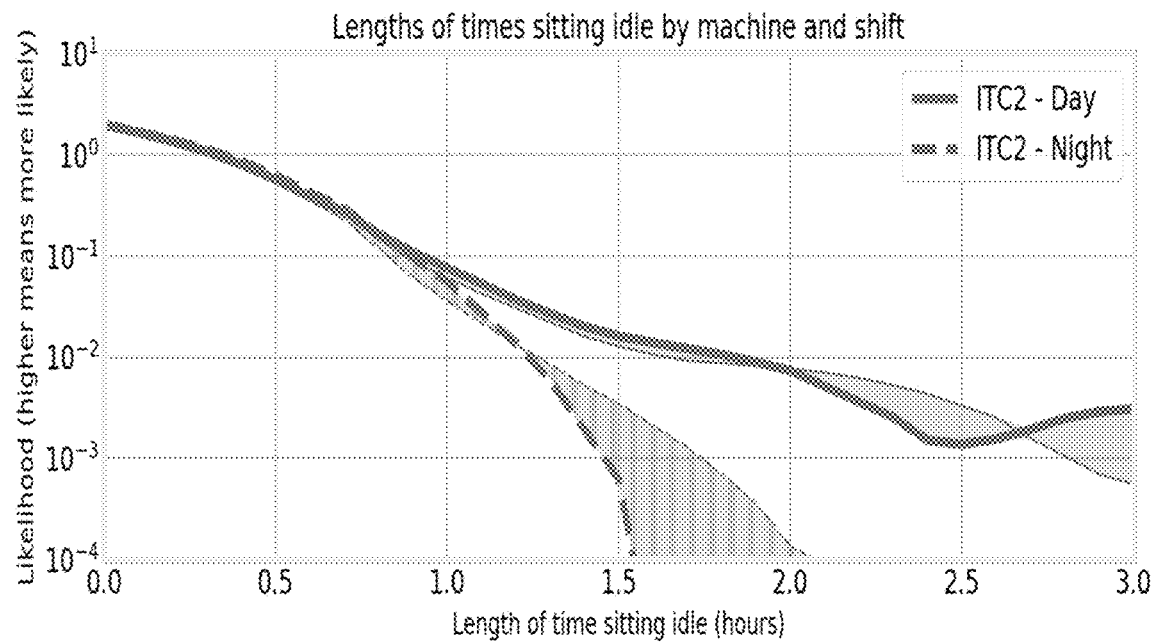
FIG. 15A is a graph of lengths of times sitting idle by machine and shift.

FIG. 15A is a graph of lengths of times sitting idle by machine and shift, and shows the relative likelihood that a machine will sit idle for a certain length of time. The y-axis is a log scale, which means that a value of $10^{-1}$ is ten times more likely than a value of $10^{-2}$. The heavy lines show the idle length distributions in August. The shaded areas show the change from July. As shown, ITC 2 Night shift further reduced the rate of long idle periods.

Figure 15B:
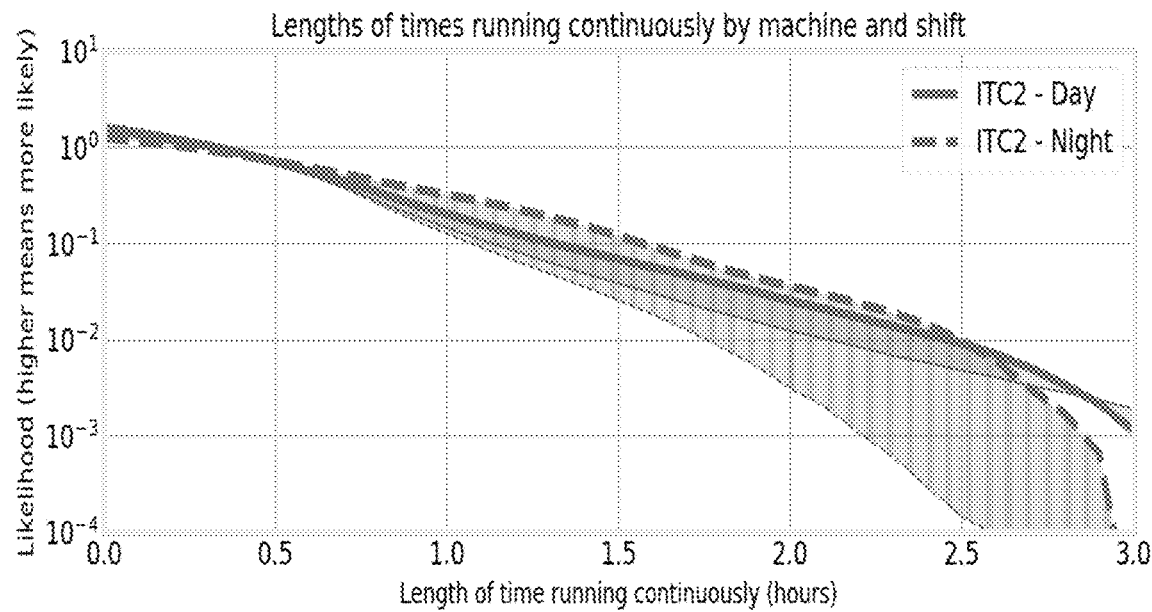
FIG. 15B is a graph of lengths of times running continuously by machine and shift.

FIG. 15B is a graph of lengths of times running continuously by machine and shift and shows the relative likelihood that a machine will run continuously for a certain length of time. The y-axis is a log scale, meaning that a value of $10^{-1}$ is ten times more likely than a value of $10^{-2}$. The heavy lines show the run length distributions in August. The shaded areas show the change from July. As shown, ITC 2 Night shift did long runs more often.

Figure 16A:
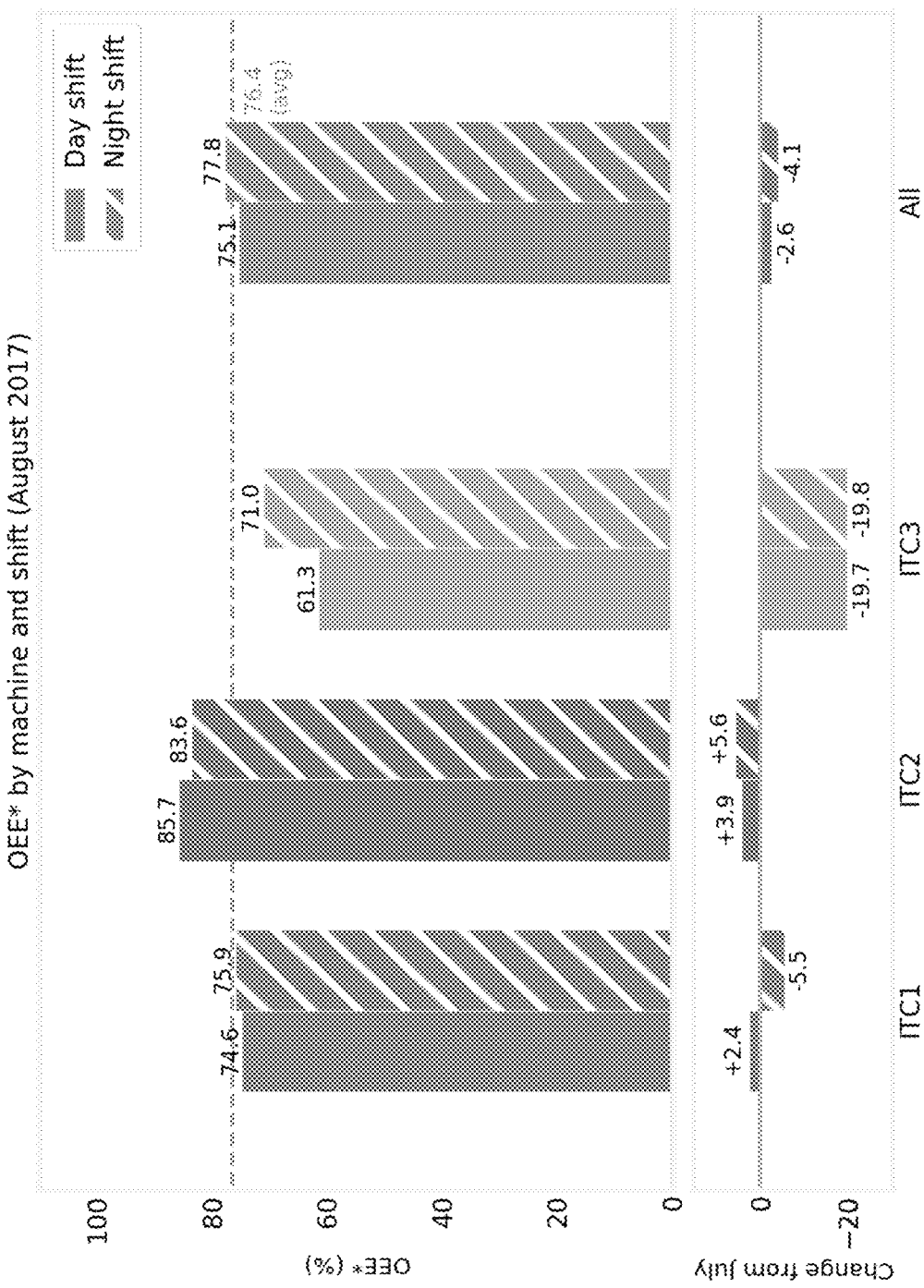
FIG. 16A is a graph of OEE by machine and shift.
Figure 16B:
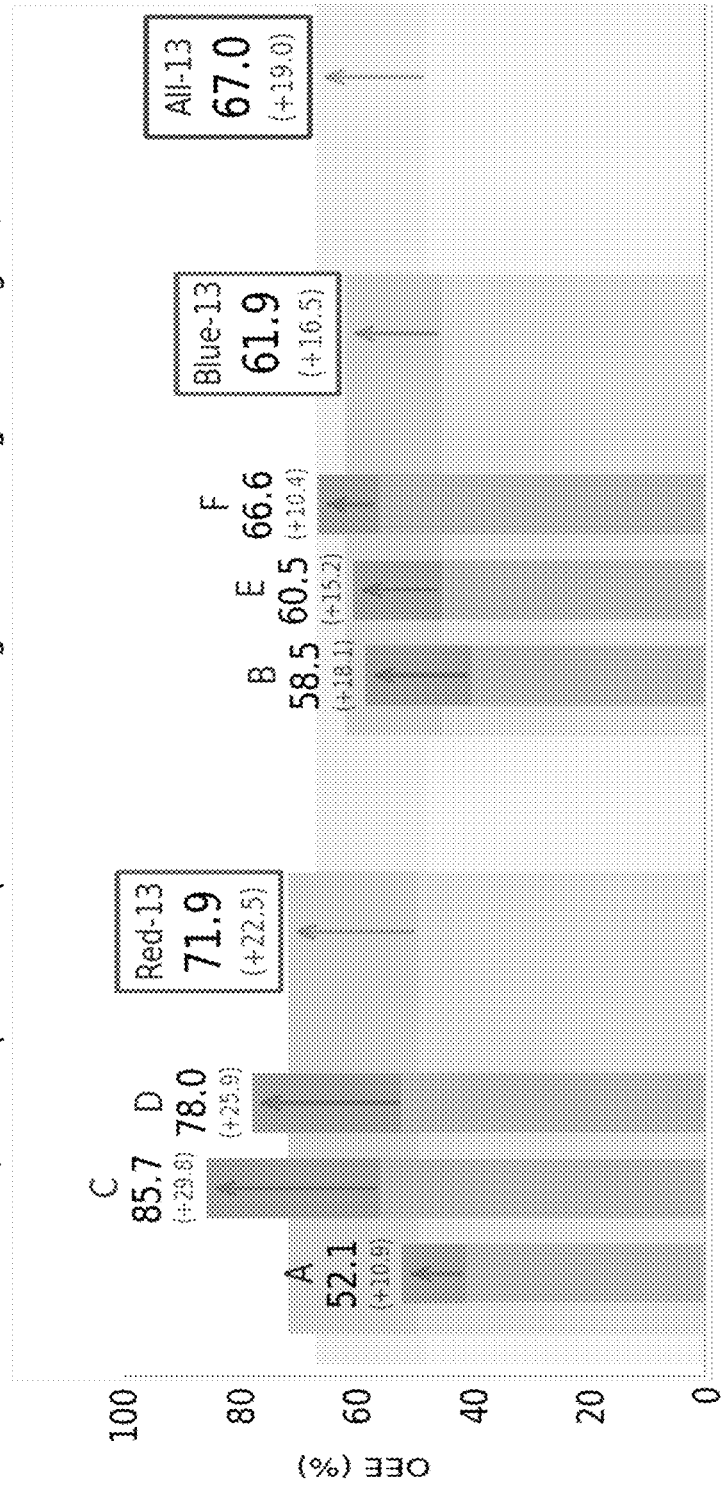
FIG. 16B is a graph of OEE by machine and shift before and after system implementation.

FIG. 16A is a graph of OEE by machine and shift. OEE for different groups of machines and shifts is shown, as well as change in OEE between two time periods. FIG. 16B is a related graph that shows a change in OEE on the same plot, and also shows group performance and change between two time points. In this case, the two time points correspond to before and after implementation of the present system, demonstrating a clear positive effect on productivity.

Figure 17:
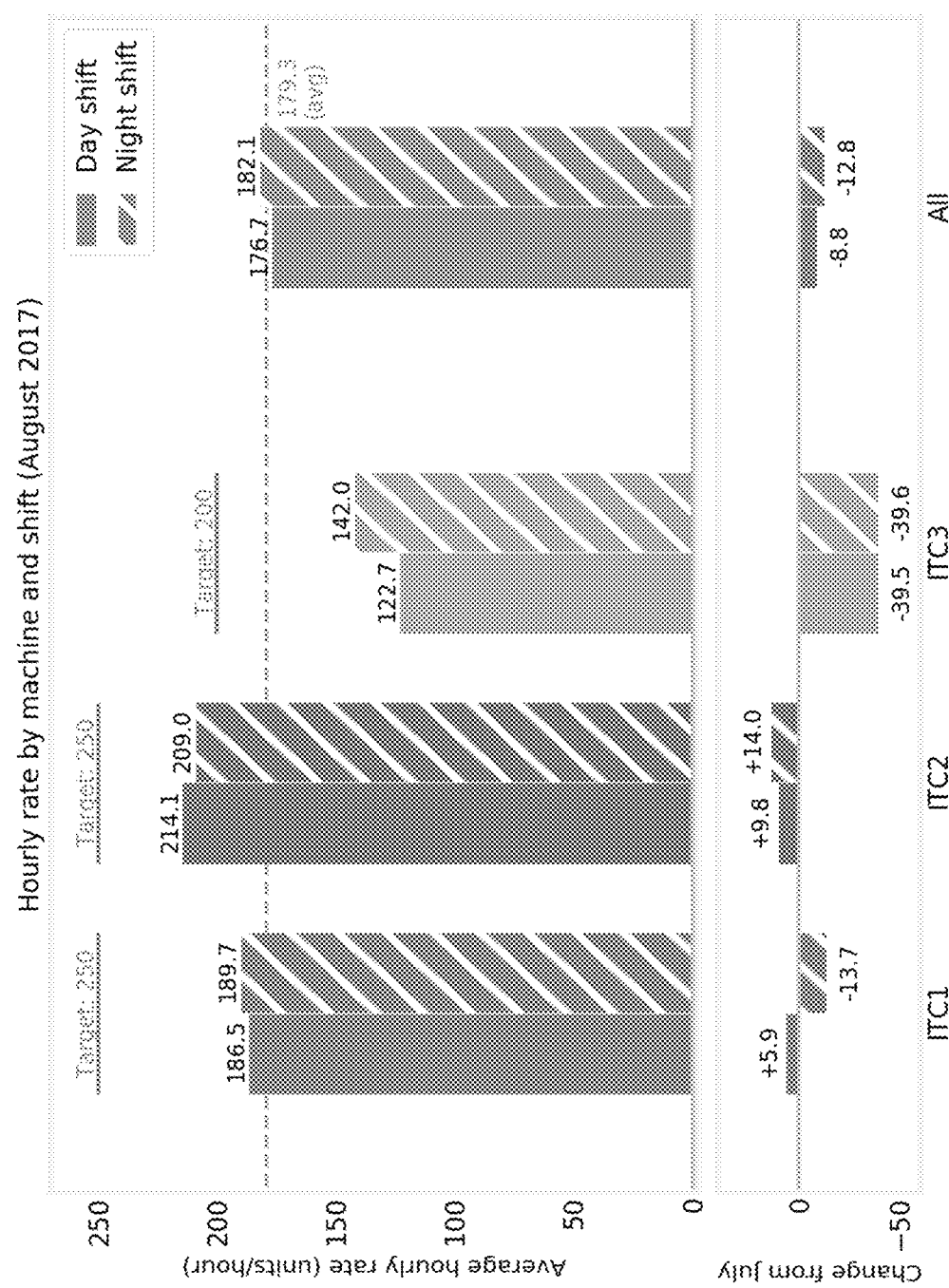
FIG. 17 is a graph of hourly rate by machine and shift.

FIG. 17 is a graph of hourly rate by machine and shift. Productivity is measured as a rate. Machines can be compared against a target rate, and other machines, as well as groups of machines, for a particular time window.

Figure 18:
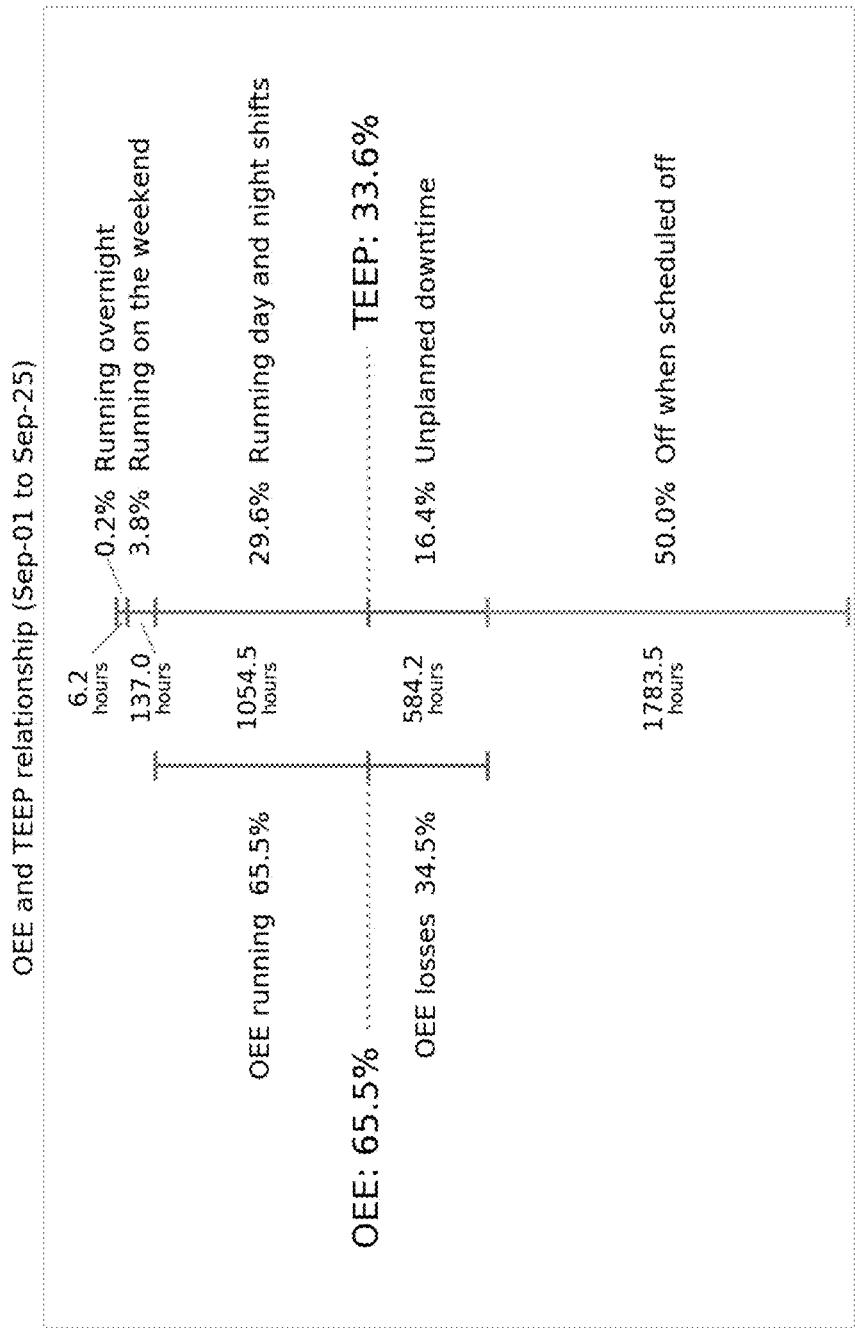
FIG. 18 is a graph of total effective equipment performance (TEEP) compared to OEE.

FIG. 18 is a graph of total effective equipment performance (TEEP) compared to OEE. TEEP provides the total time that can be scheduled for production, whereas OEE a measure of efficiency and provides the time that is actually scheduled for production. FIG. 10C shows the relationship between OEE and TEEP and divides the time between machine running and idle, and optionally can further divide the time running and idle into subgroups. This type of analysis can provide opportunities for gaining productivity in a manufacturing environment, such as deciding when to schedule another shift, i.e. go from 18 hour production to 24 hour production to increase machine output, which does not necessarily increase efficiency.

Figure 19A:
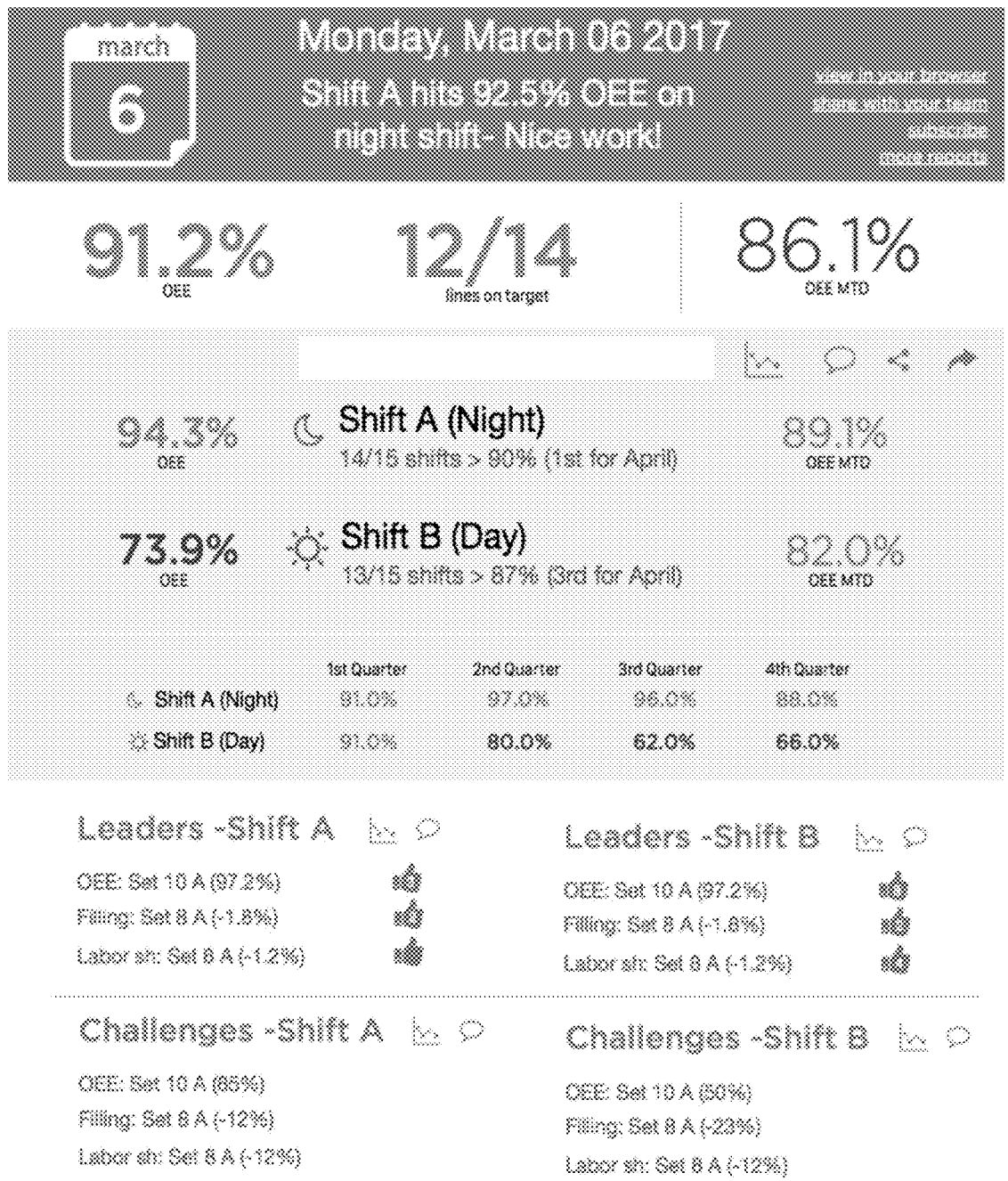
FIG. 19A is an example of a daily insight report.

FIG. 19A is an example of a daily insight report. A daily insight report provides supervisors and managers with a snapshot of the day summarizing high level metrics for active shifts. FIG. 19B is a detailed view of data provided in an example daily insight report. The detailed view provides the capability for a supervisor or manager to drill down into analytics metrics to break down performance.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A system for improving operator performance in augmented industrial management of a manufacturing process, the system comprising:
    a plurality of industrial machines, each industrial machine operated by an operator and comprising:
        a machine tap comprising an input device and a sensor connected to the industrial machine for collecting raw performance data from the industrial machine continuously over time about machine function from one or more sensor readings, the raw performance data comprising machine state data;
        a machine user interface connected to the machine tap comprising a screen and a graphical user interface for collecting and displaying context data on operation of the industrial machine from the operator using tag inputs, wherein the machine user interface provides the operator with real-time information on the machine function and process productivity and queries the operator with one or more tags to enter data on the function of the industrial machine describing the machine state at a particular time, the context data comprising an identification of the operator operating the industrial machine;
    a server connected to the machine user interface of each of the plurality of industrial machines for aggregating the performance data and the context data for each of the plurality of industrial machines;
    an analytics engine, in a processor, for generating analytics data and detecting trends in operator performance based on the performance data and the context data to compare physical parameters against known engineering limits and identify optimized process characteristics of an individual outperforming operator;
    an alert engine, in a processor, comprising an algorithm for comparing the performance data, the context data, and the analytics data of each of the plurality of industrial machines against a trigger definition, the alert engine creating an alert if the trigger definition is satisfied comprising a prescriptive action for the operator to improve operator process performance compared to the individual outperforming operator, the trigger condition based on the machine state; and
    a remote device for receiving the alert created by the alert engine by the operator, the alert indicating instructions for the operator to take the prescriptive action comprising the optimized process characteristics to improve the operator process performance, the prescriptive action identified as improving the operator process performance to limit loss or contribute to productivity gain in the industrial process.

2. The system of claim 1, further comprising a context tap connected to the machine user interface for collecting additional context data.

3. The system of claim 1, wherein the context data comprises one or more of identification of the part being manufactured, step of manufacturing, batch information, information on the primary materials being processed by the machine, work order identification, machine task in progress, and tag describing the machine state at a particular time.

4. The system of claim 1, wherein the machine state data comprises one or more of machine count, machine running speed, and sensor data.

5. The system of claim 1, wherein the alert engine comprises a plurality of trigger definitions.

6. The system of claim 1, wherein the trigger definition comprises one or more of up-time, down time, counts, rates, error codes, timestamping, and context tags.

7. The system of claim 1, wherein the sensor in the machine tap detects one or more of sound frequency, sound pressure, sound pressure level, sound intensity, sound power, equipment electrical energy consumption, change in electrical current consumption, voltage, change in voltage, temperature, thermal imaging, motion, emitted light or light intensity, imagery, depth image, point cloud, air flow, vibration, acceleration, mechanical forces, and electro-magnetic radiation.

8. The system of claim 1, wherein the trigger definition comprises analytics data.

9. The system of claim 1, wherein the analytics engine tracks a response time between the alert received at the remote device and a time the alert is addressed.

10. The system of claim 9, wherein the response time is gamified to incentivize shorter response times.

11. The system of claim 1, wherein the prescriptive action comprises one or more of scheduling of operator activities, directed operator training, scheduling of machine calibration, scheduling of materials supply filling, scheduling of operator planned downtime, and changing industrial machine location.

12. A method of improving operator performance in augmented industrial management in a manufacturing process, the method comprising:
    for a plurality of industrial machines, each industrial machine operated by an operator:
        collecting raw performance data from each industrial machine about machine function using a machine tap comprising an input device and a sensor to obtain one or more sensor readings continuously over time, the raw performance data comprising machine state data;
        collecting context data on operation of the industrial machine on a machine user interface connected to the machine tap comprising a screen and a graphical user interface by displaying to an operator real-time information on the machine function and querying the operator with one or more tags requesting information on the machine state of the industrial machine at a particular time, the machine user interface providing the operator with real-time information on the machine state and process productivity at a particular time, the context data comprising an identification of the operator operating the industrial machine;

aggregating the raw performance data and the context data for each industrial machine;

analyzing the raw performance data and the context data for each the plurality of industrial machines in a processor to compare physical parameters against known engineering limits and detect trends in individual operator performance which identify optimized process characteristics of an outperforming operator and generate analytics data;

for at least one of the plurality of industrial machines, comparing the raw performance data, the context data, and the analytics data, in a processor, against a trigger definition, the trigger condition based on the machine state; and, if the trigger definition is satisfied:

generating an alert, the alert comprising a prescriptive action for the operator to improve operator process compared to the individual outperforming operator based on the optimized process characteristics, the prescriptive action identified as improving the operator process performance to limit loss or contribute to productivity gain in the industrial process;

sending the alert to a remote device; and confirming that the alert is actioned.

13. The method of claim 12, wherein the context data is collected at one or more of a machine user interface, enterprise resource system, server, and database.

14. The method of claim 12, wherein the machine state data comprises one or more of machine count, machine running speed, and sensor data.

15. The method of claim 12, wherein the context data comprises one or more of identification of one or more of the part being manufactured, step of manufacturing, batch information, information on the primary materials being processed by the machine, work order identification, machine task in progress, and tag describing the machine state at a particular time.

16. The method of claim 12, wherein the alert is sent in real-time.

17. The method of claim 12, wherein the alert reports a machine performance metric to one or more of the remote device and machine user interface.

18. The method of claim 12, further comprising clearing a tag once the queried machine function information is received from the operator.

19. The method of claim 12, wherein the prescriptive action comprises one or more of scheduling of operator activities, directed operator training, scheduling of machine calibration, scheduling of materials supply filling, scheduling of operator planned downtime, and changing industrial machine location.

\* \* \* \* \*